US011493922B1

(12) United States Patent
Avram et al.

(10) Patent No.: US 11,493,922 B1
(45) Date of Patent: Nov. 8, 2022

(54) PERIMETER SENSOR HOUSINGS

(71) Applicant: WAYMO LLC, Mountain View, CA (US)

(72) Inventors: Peter Avram, Ann Arbor, MI (US);
Kimberly Toth, Sunnyvale, CA (US);
Jeremy Dittmer, Mountain View, CA (US); Giulia Guidi, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 202 days.

(21) Appl. No.: 16/737,359

(22) Filed: Jan. 8, 2020

Related U.S. Application Data

(60) Provisional application No. 62/954,938, filed on Dec. 30, 2019.

(51) Int. Cl.
*G05D 1/00* (2006.01)
*G01S 17/86* (2020.01)
(Continued)

(52) U.S. Cl.
CPC .......... *G05D 1/0088* (2013.01); *B60W 10/18* (2013.01); *B60W 10/20* (2013.01);
(Continued)

(58) Field of Classification Search
CPC .... B60W 30/08; B60W 40/02; B60W 40/105; B60W 60/00; B60W 10/18; B60W 10/20; B60R 21/0134; G01S 17/931
See application file for complete search history.

(56) References Cited

U.S. PATENT DOCUMENTS 9,234,618 B1 * 1/2016 Zhu .................... G01S 7/497
10,444,752 B2 10/2019 Kim et al.
(Continued)

FOREIGN PATENT DOCUMENTS

CN 108189777 A 6/2018
KR 101998298 B1 7/2019
(Continued)

OTHER PUBLICATIONS

International Search Report and Written Opinion for Application No. PCT/US20/28211 dated Feb. 2, 2021.
(Continued)

*Primary Examiner* — Tan Q Nguyen
(74) *Attorney, Agent, or Firm* — Botos Churchill IP Law

(57) ABSTRACT

The technology relates to an exterior sensor system for a vehicle configured to operate in an autonomous driving mode. The technology includes a close-in sensing (CIS) camera system to address blind spots around the vehicle. The CIS system is used to detect objects within a few meters of the vehicle. Based on object classification, the system is able to make real-time driving decisions. Classification is enhanced by employing cameras in conjunction with lidar sensors. The specific arrangement of multiple sensors in a single sensor housing is also important to object detection and classification. Thus, the positioning of the sensors and support components are selected to avoid occlusion and to otherwise prevent interference between the various sensor housing elements.

23 Claims, 35 Drawing Sheets

(51) Int. Cl.

| | | |
|---|---|---|
| *G01S 7/481* | (2006.01) | |
| *G01S 13/86* | (2006.01) | |
| *G01S 7/02* | (2006.01) | |
| *G01S 17/89* | (2020.01) | |
| *G01S 13/89* | (2006.01) | |
| *G05D 1/02* | (2020.01) | |
| *B60W 60/00* | (2020.01) | |
| *B60W 10/18* | (2012.01) | |
| *B60W 10/20* | (2006.01) | |
| *H04N 5/235* | (2006.01) | |
| *G06V 20/58* | (2022.01) | |
| *G06K 9/62* | (2022.01) | |
| *B60S 1/56* | (2006.01) | |

(52) U.S. Cl.
CPC ............. *B60W 60/001* (2020.02); *G01S 7/02* (2013.01); *G01S 7/4813* (2013.01); *G01S 13/867* (2013.01); *G01S 13/89* (2013.01); *G01S 17/86* (2020.01); *G01S 17/89* (2013.01); *G05D 1/0214* (2013.01); *G06V 20/58* (2022.01); *H04N 5/2354* (2013.01); *B60S 1/56* (2013.01); *B60W 2420/42* (2013.01); *B60W 2420/52* (2013.01); *B60W 2710/18* (2013.01); *B60W 2710/20* (2013.01); *B60W 2720/10* (2013.01); *G01S 7/027* (2021.05); *G05D 2201/0213* (2013.01); *G06K 9/6288* (2013.01)

(56) References Cited

U.S. PATENT DOCUMENTS

| | | |
|---|---|---|
| 2008/0150786 A1 | 6/2008 | Breed |
| 2009/0015460 A1 | 1/2009 | Fox et al. |
| 2012/0081544 A1 | 4/2012 | Wee |
| 2012/0265416 A1 | 10/2012 | Lu et al. |
| 2013/0034266 A1 | 2/2013 | Shamir et al. |
| 2014/0111812 A1* | 4/2014 | Baeg ..................... G01S 7/4814 356/610 |
| 2015/0219764 A1 | 8/2015 | Lipson |
| 2015/0379766 A1 | 12/2015 | Newman et al. |
| 2016/0116593 A1 | 4/2016 | Kim et al. |
| 2017/0176597 A1 | 6/2017 | Gruver et al. |
| 2017/0292908 A1 | 10/2017 | Wilk et al. |
| 2017/0297488 A1 | 10/2017 | Wang et al. |
| 2017/0357267 A1* | 12/2017 | Foster .................. A01B 69/008 |
| 2018/0011496 A1 | 1/2018 | Fairfield et al. |
| 2018/0032078 A1 | 2/2018 | Ferguson et al. |
| 2018/0032822 A1 | 2/2018 | Frank et al. |
| 2018/0082588 A1 | 3/2018 | Hoffman et al. |
| 2018/0288320 A1 | 10/2018 | Melick et al. |
| 2018/0299534 A1 | 10/2018 | Lachapelle et al. |
| 2018/0299900 A1 | 10/2018 | Bae et al. |
| 2019/0139258 A1 | 5/2019 | Slattery et al. |
| 2019/0204845 A1 | 7/2019 | Grossman et al. |
| 2020/0195816 A1 | 6/2020 | Stein et al. |
| 2020/0255030 A1* | 8/2020 | Yamamoto .............. G01S 17/93 |
| 2021/0046924 A1 | 2/2021 | Caldwell et al. |

FOREIGN PATENT DOCUMENTS

| | | |
|---|---|---|
| WO | 2018138584 A1 | 8/2018 |
| WO | 2018196001 A1 | 11/2018 |
| WO | 2019035652 A1 | 2/2019 |
| WO | 2019122922 A1 | 6/2019 |

OTHER PUBLICATIONS

International Search Report and Written Opinion for Application No. PCT/US20/61260 dated Feb. 10, 2021.

Huang et al. "Tightly-coupled LIDAR and computer vision integration for vehicle detection" 2009 IEEE, 6 Pages.

* cited by examiner

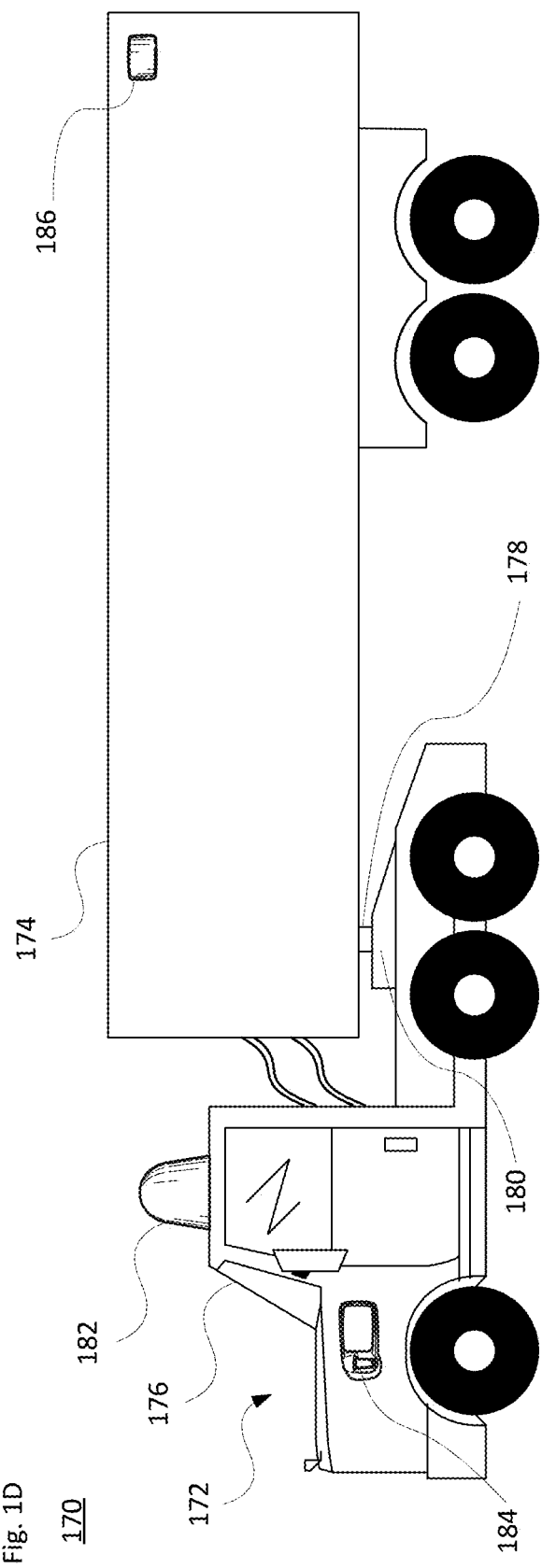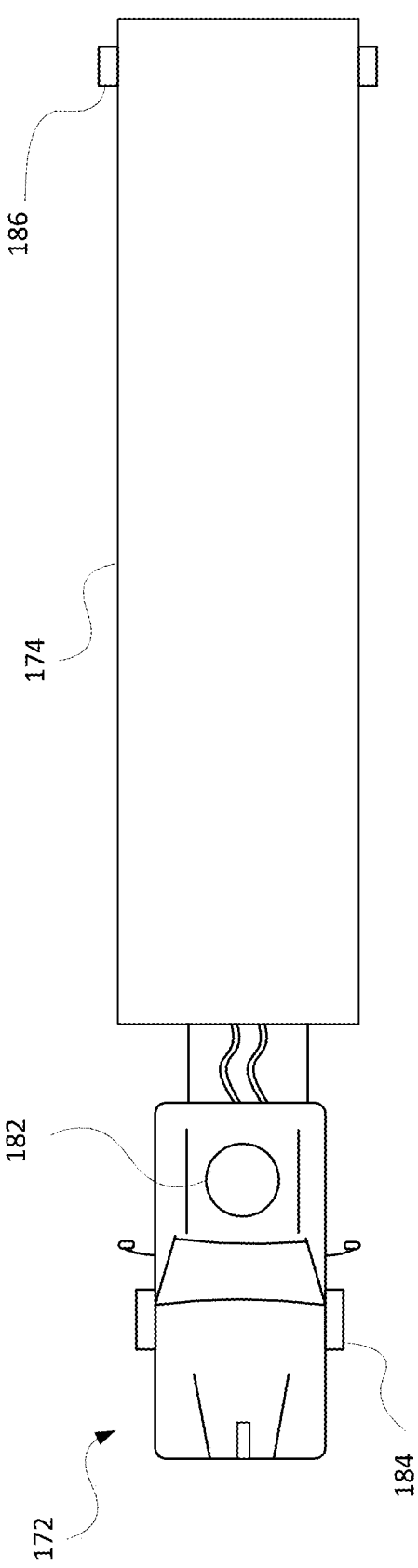

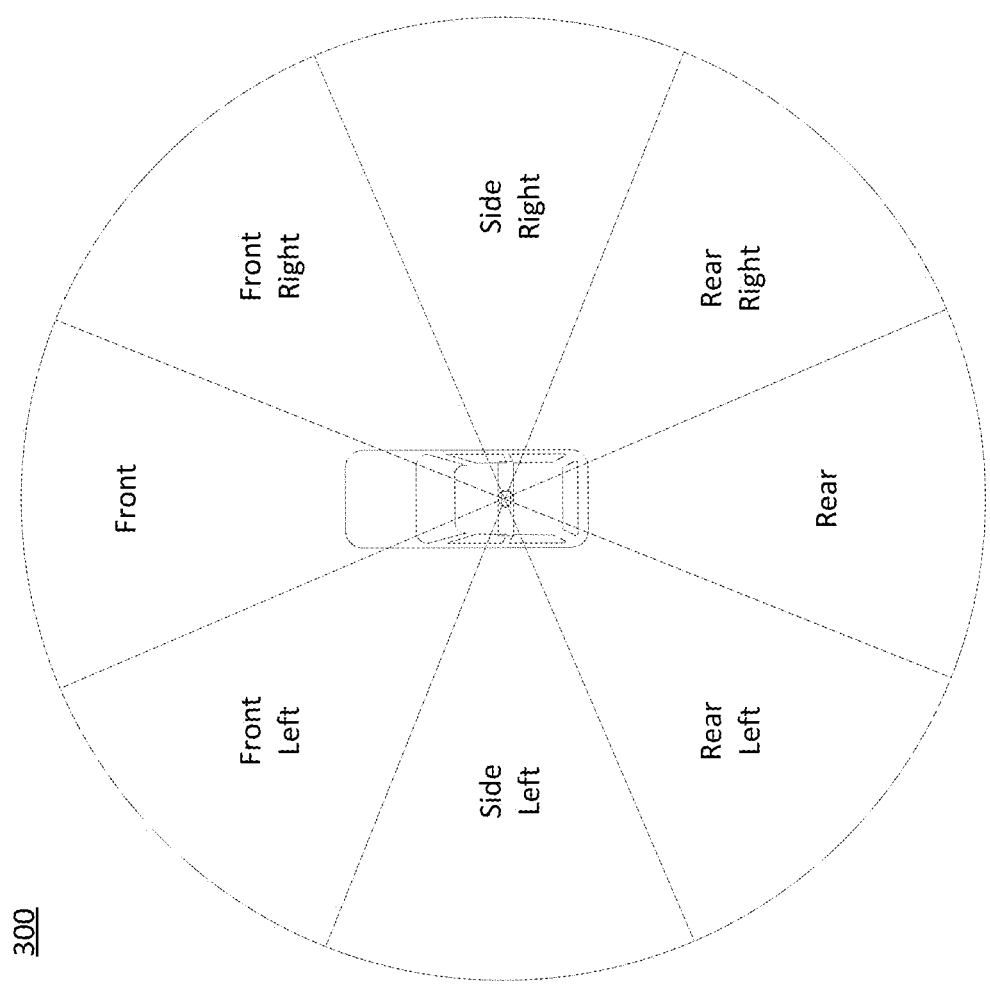
Fig. 3    300

600

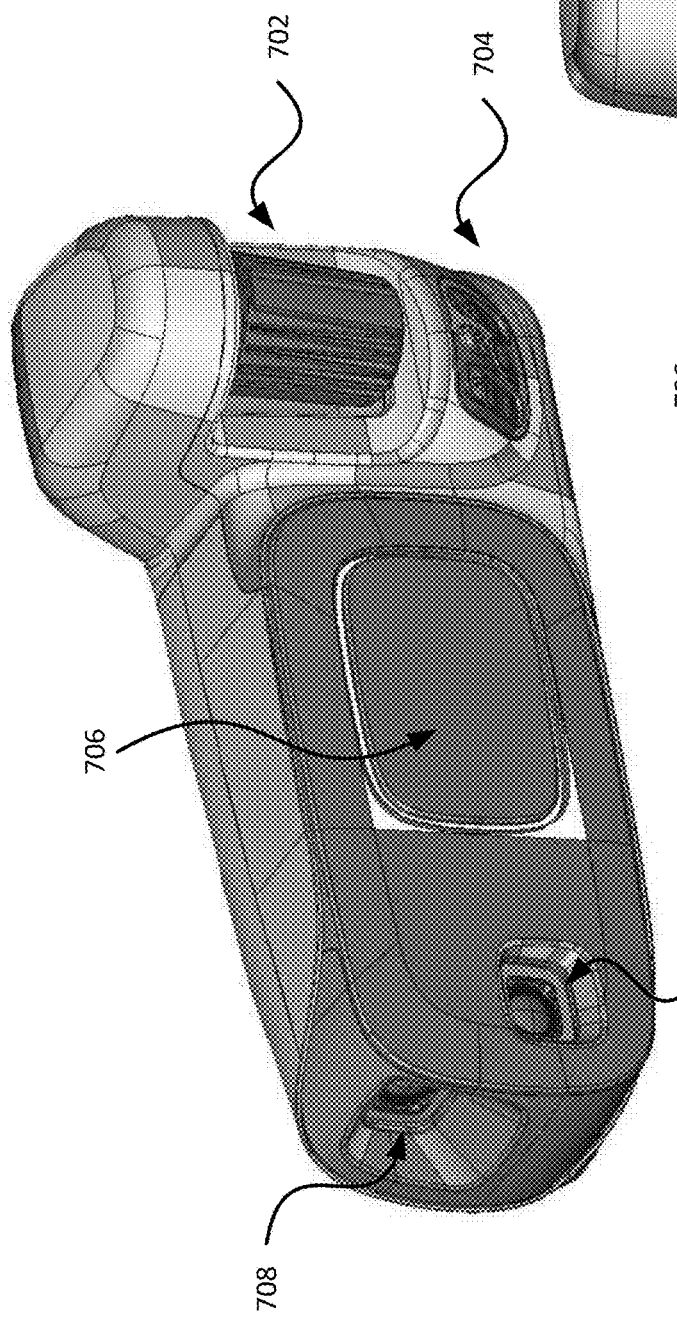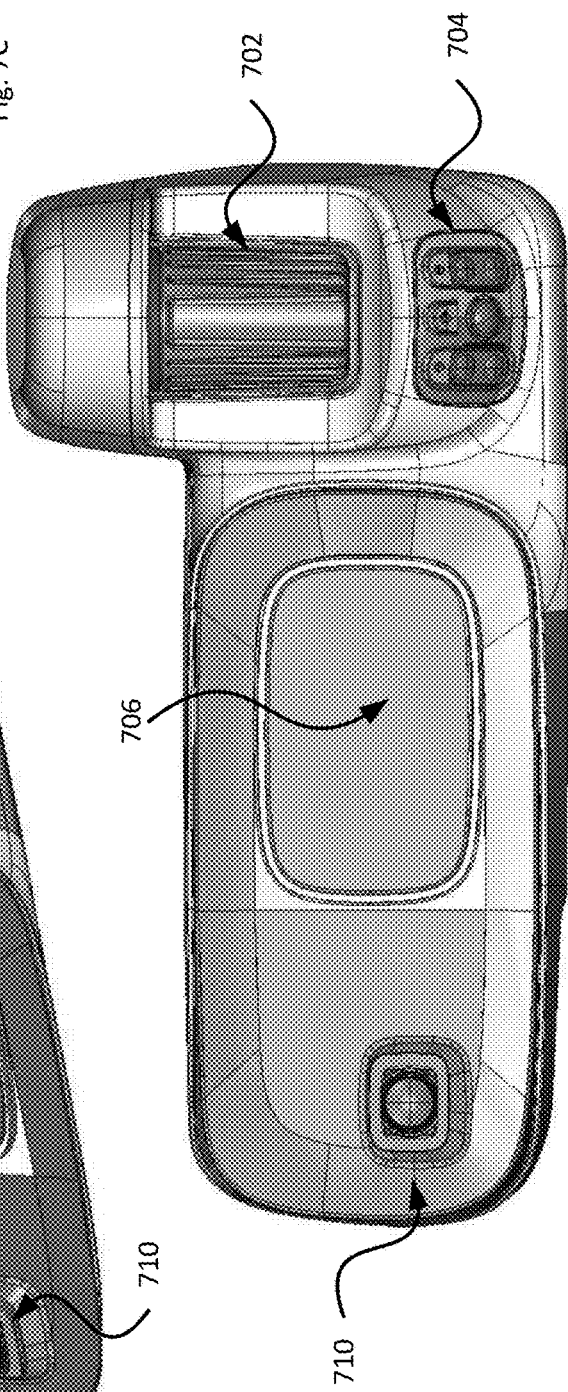

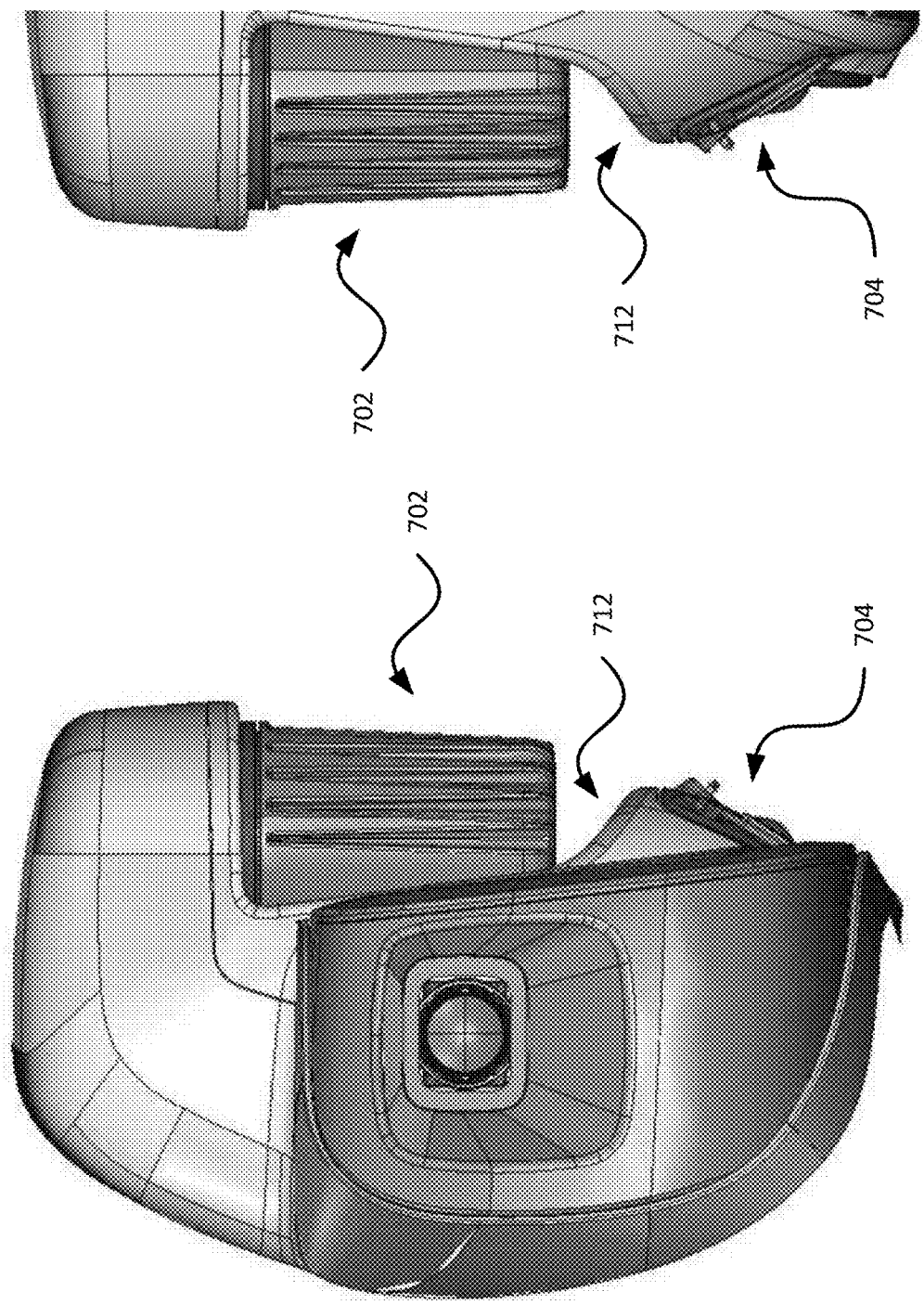

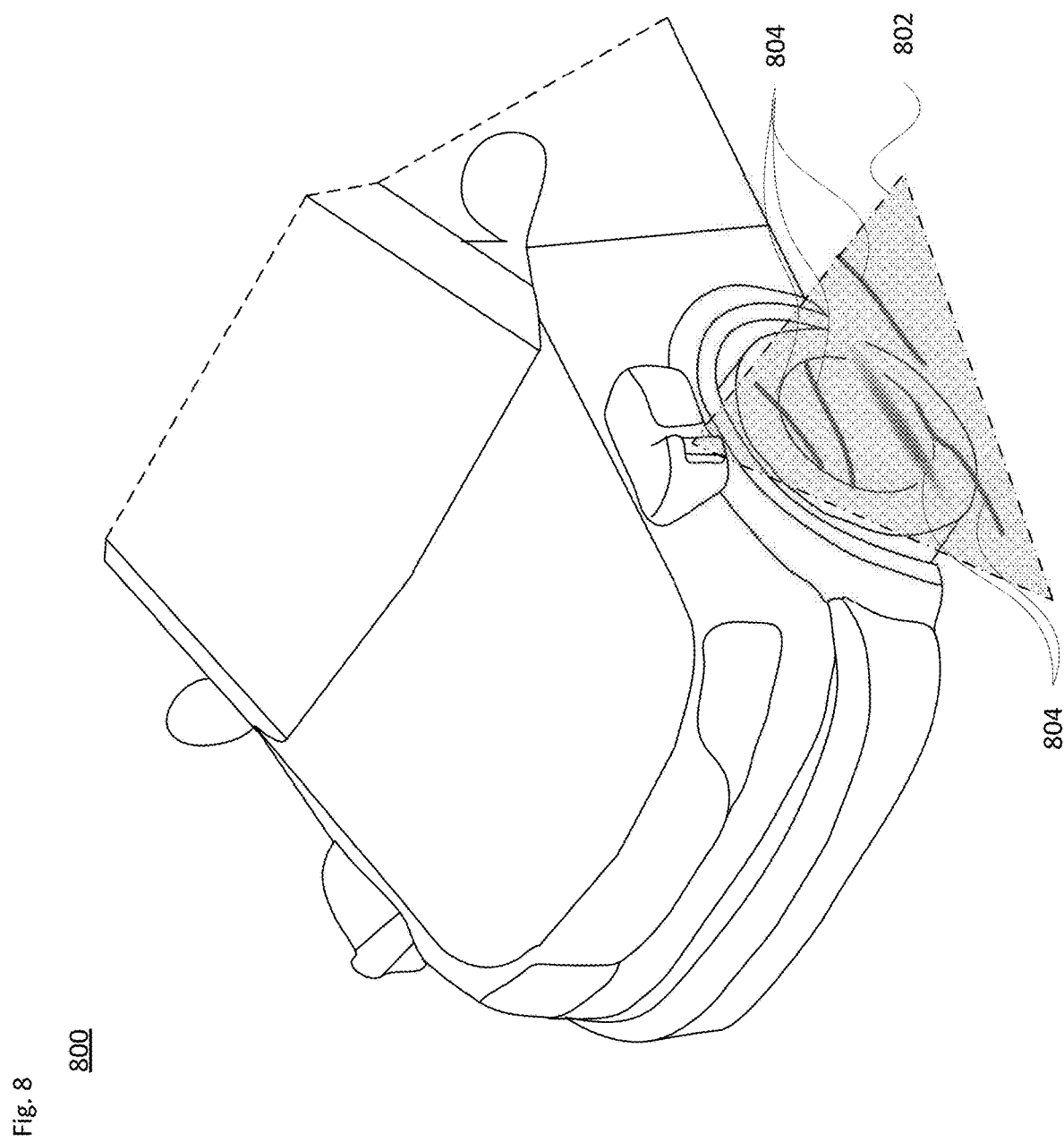

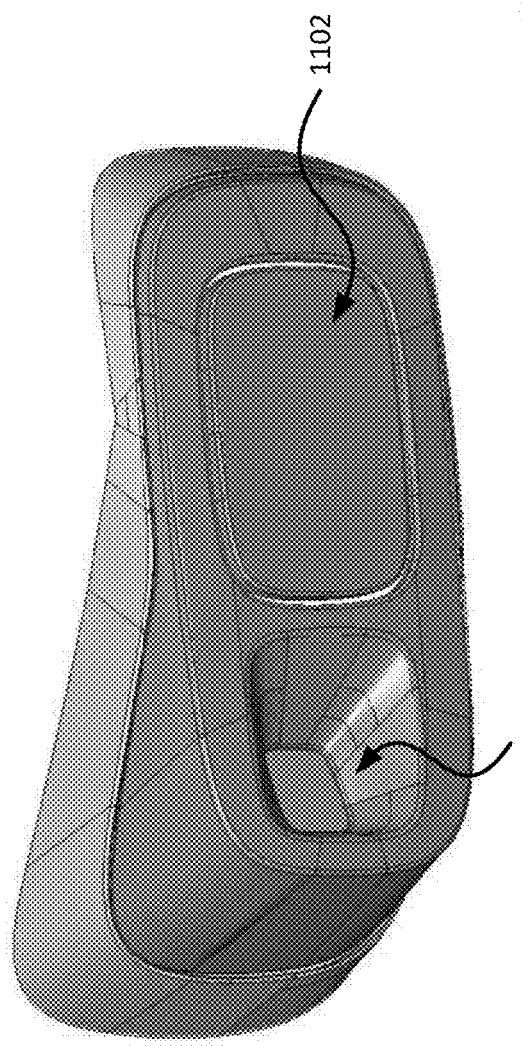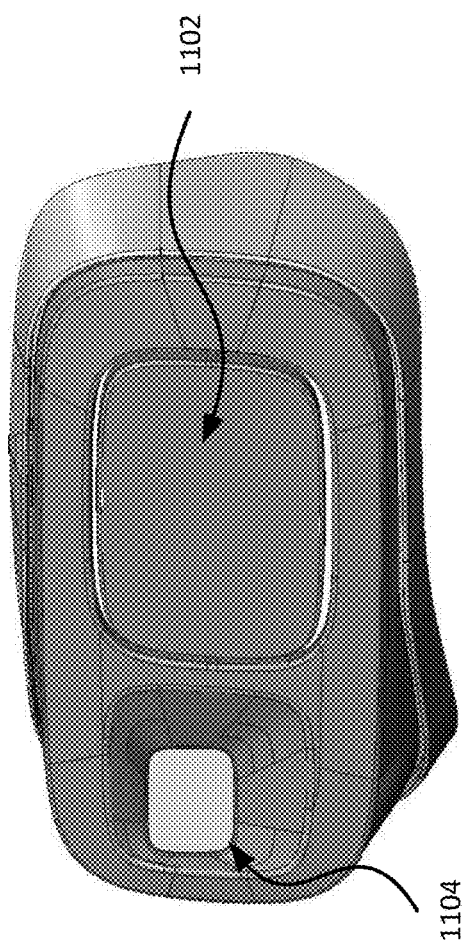

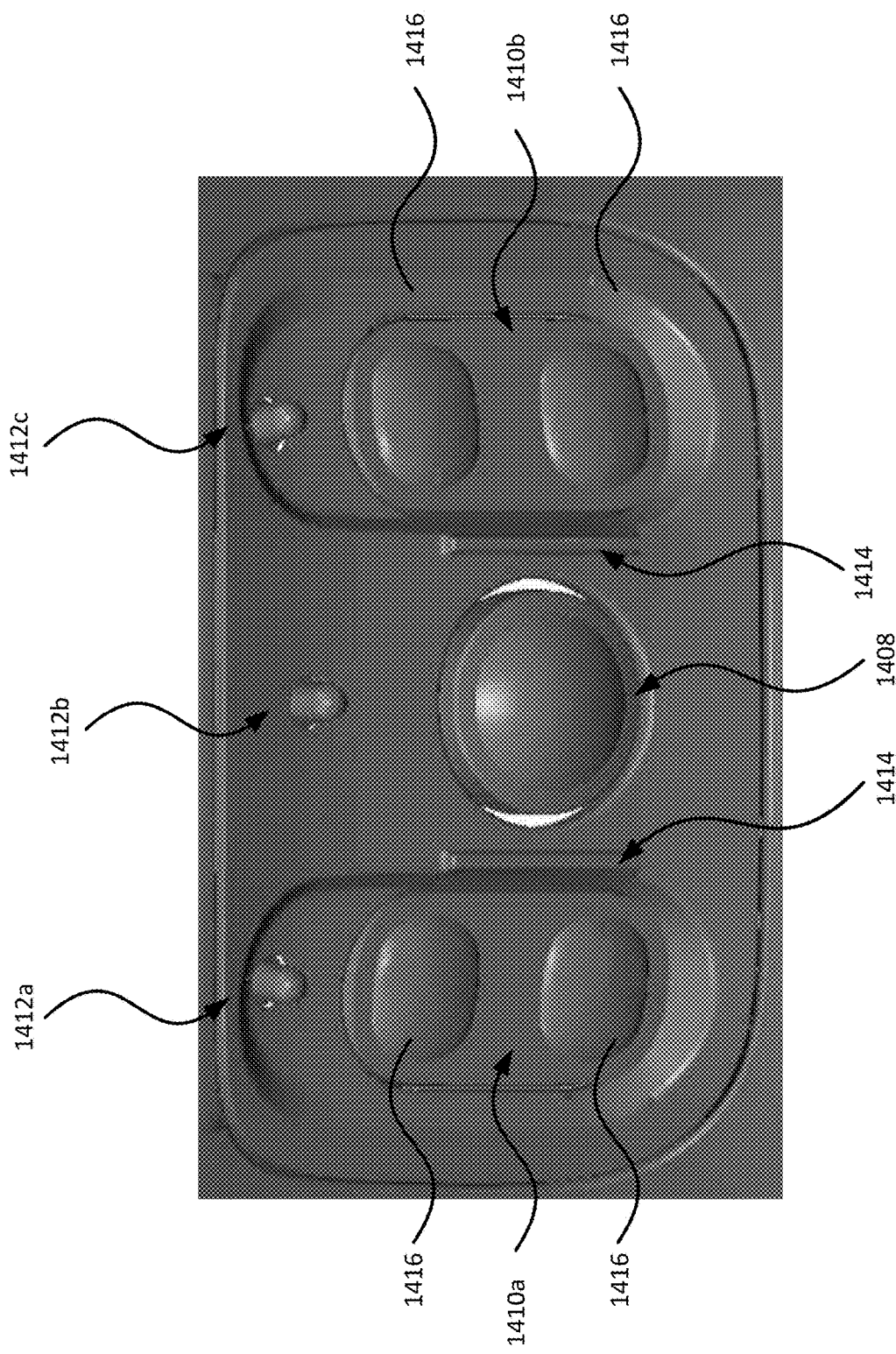

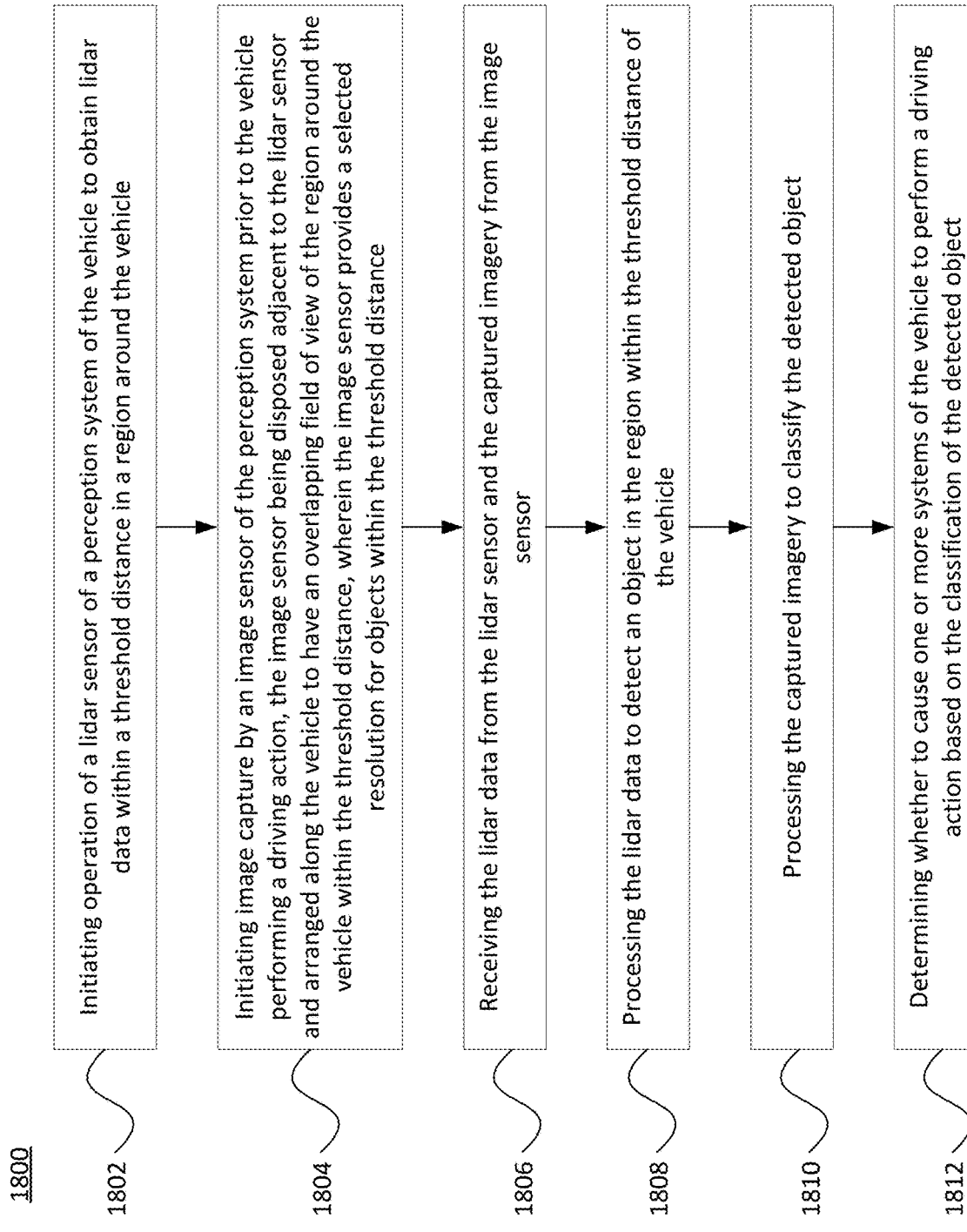

PERIMETER SENSOR HOUSINGS

CROSS-REFERENCE TO RELATED APPLICATIONS

The present application claims the benefit of the filing date of U.S. Provisional Application No. 62/954,938, filed Dec. 30, 2019, the entire disclosure of which is incorporated by reference herein. The present application is related to co-pending U.S. application Ser. No. 16/737,263, entitled Close-in Sensing Camera System, filed concurrently herewith, the entire disclosure of which is incorporated by reference herein.

BACKGROUND

Self-driving (autonomous) vehicles do not require a human driver in some or all situations. Such vehicles can transport passengers or cargo from one location to another. They may operate in a fully autonomous mode or a partially autonomous mode where a person may provide some driving input. In order to operate in an autonomous mode, the vehicle may employ sensors for detecting vehicles and other objects in its external environment, and use received information from the sensors to perform various driving operations. However, objects immediately adjacent to the vehicle and occlusions in the sensors' fields of view may adversely impact driving operations.

BRIEF SUMMARY

The technology relates to an exterior sensor system for a vehicle configured to operate in a self-driving (autonomous) mode. Generally, sensors are used to detect objects in the environment around the vehicle. These can include lidar, radar, cameras, sonar and/or other sensors. Different sensors have various benefits, and sensor fusion from multiple sensors can be employed to obtain a more complete understanding of the environment so that the vehicle can make driving decisions. However, depending on the size, shape, etc. of the vehicle and objects in the environment, blind spots can exist that can impact driving decisions and other autonomous operations. These include blind spots immediately adjacent to the vehicle. Such issues can be substantially mitigated by careful selection and positioning of sensor housings that may co-locate different types of sensors in an integrated unit. This can include a close-in camera system integrated with a lidar sensor, perimeter view cameras collocated with radar and/or other sensors, etc.

According to one aspect, an external sensing module for a vehicle configured to operate in an autonomous driving mode is provided. The external sensing module comprises a lidar sensor and an image sensor. The lidar sensor is arranged along a first housing section of the external sensing module. The lidar sensor is configured to detect objects in a region of an external environment around the vehicle and within a threshold distance of the vehicle. The image sensor is arranged along a second housing section of the external sensing module. The second housing section with the image sensor is vertically aligned with the first housing section with the lidar sensor. The image sensor is arranged along the vehicle to have an unobstructed field of view of the region of the external environment. The image sensor provides a selected resolution for objects within the threshold distance of the vehicle to classify objects detected by the lidar sensor. A third housing section of the external sensing module is disposed between the first and second housing sections. The third housing section includes an exterior surface arranged to prevent interference between the image sensor and the lidar sensor.

The image sensor can be arranged above or below the lidar sensor. The image sensor may be arranged at a downward angle relative to a side of the vehicle, in which the downward angle is on the order of 20-40° to provide coverage within the threshold distance of the vehicle. The threshold distance may be between 1-3 meters from the vehicle.

The external sensing module may further comprise one or more illuminator units configured to illuminate the field of view of the image sensor. In one example, the one or more illuminator units may be disposed adjacent to the image sensor along the second housing section. For instance, the one or more illuminator units can be a pair of illuminators disposed on either side of the image sensor. The external sensing module may further include a cleaning mechanism configured to clean the image sensor and/or the one or more illuminator units.

In an example, the external sensing module further comprises a radar sensor disposed along a fourth housing section of the external sensing module arranged to one side of both the first and second housing sections. The fourth housing section may be arranged closer to a front of the vehicle than the first and second sections. The external sensing module may further comprise at least one additional image sensor disposed along a fifth housing section of the external sensing module, in which the fourth housing section is arranged between the fifth housing section and the first and second housing sections. In one example, the at least one additional image sensor comprises a given additional image sensor disposed generally planar to the radar sensor and arranged to provide a selected field of view along a side of the vehicle separate from the field of view of the image sensor arranged along the second housing section. In another example, the at least one additional image sensor comprises a given additional image sensor disposed generally perpendicular to the radar sensor and arranged to provide a selected field of view along a front of the vehicle separate from the field of view of the image sensor arranged along the second housing section. The at least one additional image sensor may include first and second additional image sensors. Here, the first additional image sensor is disposed generally planar to the radar sensor and arranged to provide a selected field of view along a side of the vehicle separate from the field of view of the image sensor arranged along the second housing section, And the second additional image sensor is disposed generally perpendicular to the radar sensor and the first additional image sensor and arranged to provide a selected field of view along a front of the vehicle separate from the field of view of the image sensor arranged along the second housing section and the selected field of view of the first additional image sensor.

According to another aspect, an external sensing module for a vehicle configured to operate in an autonomous driving mode is provided. The external sensing module comprises a radar sensor and an image sensor. The radar sensor is arranged along a first housing section of the external sensing module. The radar sensor is configured to detect objects in a region of an external environment around the vehicle and within a threshold distance of the vehicle. The image sensor is arranged along a second housing section of the external sensing module. The second housing section with the image sensor is adjacent to the first housing section with the radar sensor. The image sensor is arranged along the vehicle to have an overlapping field of view of the region of the external environment. The image sensor provides a selected resolution for objects within the threshold distance of the vehicle to classify objects detected by the radar sensor.

The external sensing module may be disposed along a rear fascia of the vehicle to detect and classify objects behind the vehicle. For instance, the field of view of the image sensor may be between 30-60° along the rear of the vehicle. Alternatively or additionally, the field of view of the image sensor has an outer azimuth of between 15-35° and an inner azimuth of between 10-25°. The second housing section may be disposed closer to an adjacent side of the vehicle than the first housing section.

According to yet another aspect, a vehicle configured to operate in an autonomous driving mode is provided. The vehicle comprises a driving system and an external sensing module. The driving system includes a deceleration system configured to control braking of the vehicle, an acceleration system configured to control acceleration of the vehicle, and a steering system configured to control wheel orientation and a direction of the vehicle. The external sensing module includes a lidar sensor and an image sensor. The lidar sensor is arranged along a first housing section of the external sensing module. The lidar sensor is configured to detect objects in a region of an external environment around the vehicle and within a threshold distance of the vehicle. The image sensor is arranged along a second housing section of the external sensing module. The second housing section with the image sensor is vertically aligned with the first housing section with the lidar sensor. The image sensor is arranged along the vehicle to have an unobstructed field of view of the region of the external environment. The image sensor provides a selected resolution for objects within the threshold distance of the vehicle to classify objects detected by the lidar sensor. A third housing section of the external sensing module is disposed between the first and second housing sections. The third housing section includes an exterior surface arranged to prevent interference between the image sensor and the lidar sensor.

The external sensing module may further comprise one or more illuminator units configured to illuminate the field of view of the image sensor. The one or more illuminator units are disposed adjacent to the image sensor along the second housing section. The external sensing module may further include a cleaning mechanism configured to clean the image sensor and/or the one or more illuminator units.

BRIEF DESCRIPTION OF THE DRAWINGS

FIGS. 1D-E illustrate an example cargo vehicle configured for use with aspects of the technology.

FIG. 3 illustrates examples of regions around a vehicle in accordance with aspects of the disclosure.

FIGS. 7A-F illustrate an example perimeter sensor housing assembly in accordance with aspects of the disclosure.

FIG. 8 illustrates an example sensor arrangement to minimize occlusions in accordance with aspects of the disclosure.

FIGS. 11A-C illustrate an example perimeter sensor housing assembly in accordance with aspects of the disclosure.

FIGS. 14A-E illustrate another example perimeter sensor housing assembly in accordance with aspects of the disclosure.

FIG. 18 illustrates a method of operation in accordance with aspects of the disclosure.

DETAILED DESCRIPTION

Aspects of the technology involve a close-in sensing (CIS) camera system to address blind spots around the vehicle. The CIS system is used to help classify objects detected within a few meters (e.g., less than 3 meters) of the vehicle. Based on object classification, the system is able to distinguish between objects that may be "driveable" (something the vehicle can drive over) versus "non-drivable". By way of example, a driveable object could be vegetation, a pile of leaves, a paper or plastic bag, etc., while non-driveable objects would include those types of objects that either must be avoided (e.g., pedestrians, bicyclists, pets, etc.) or that may damage the vehicle if driven over (e.g., tall curbs, broken glass, deep potholes, fire hydrant, etc.) In one scenario, classification is enhanced by employing cameras in conjunction with lidar sensors. This can be very important when trying to determine whether a person is next to the vehicle. The cameras may each include one or more image sensors. The image sensors may be CMOS sensors, although CCD or other types of imaging elements may be employed.

Other aspects of the technology relate to the arrangements and configurations of multiple sensors in a single sensor housing. As discussed further below, there are advantages to co-locating different sensor types in the same housing, for instance to aid in sensor fusion. However, the positioning of the sensors can be very important, for instance to avoid occlusion of one sensor by another, to ensure that the calibration between the sensors is more accurate, and/or to otherwise prevent interference between the sensors. By way of example, an illuminator, such as an infrared (IR) or optical illuminator, should be arranged to avoid shining its light directly into the lens of a camera, for instance a camera that is sensitive to IR light.

Example Vehicle Systems

Figure 1A:
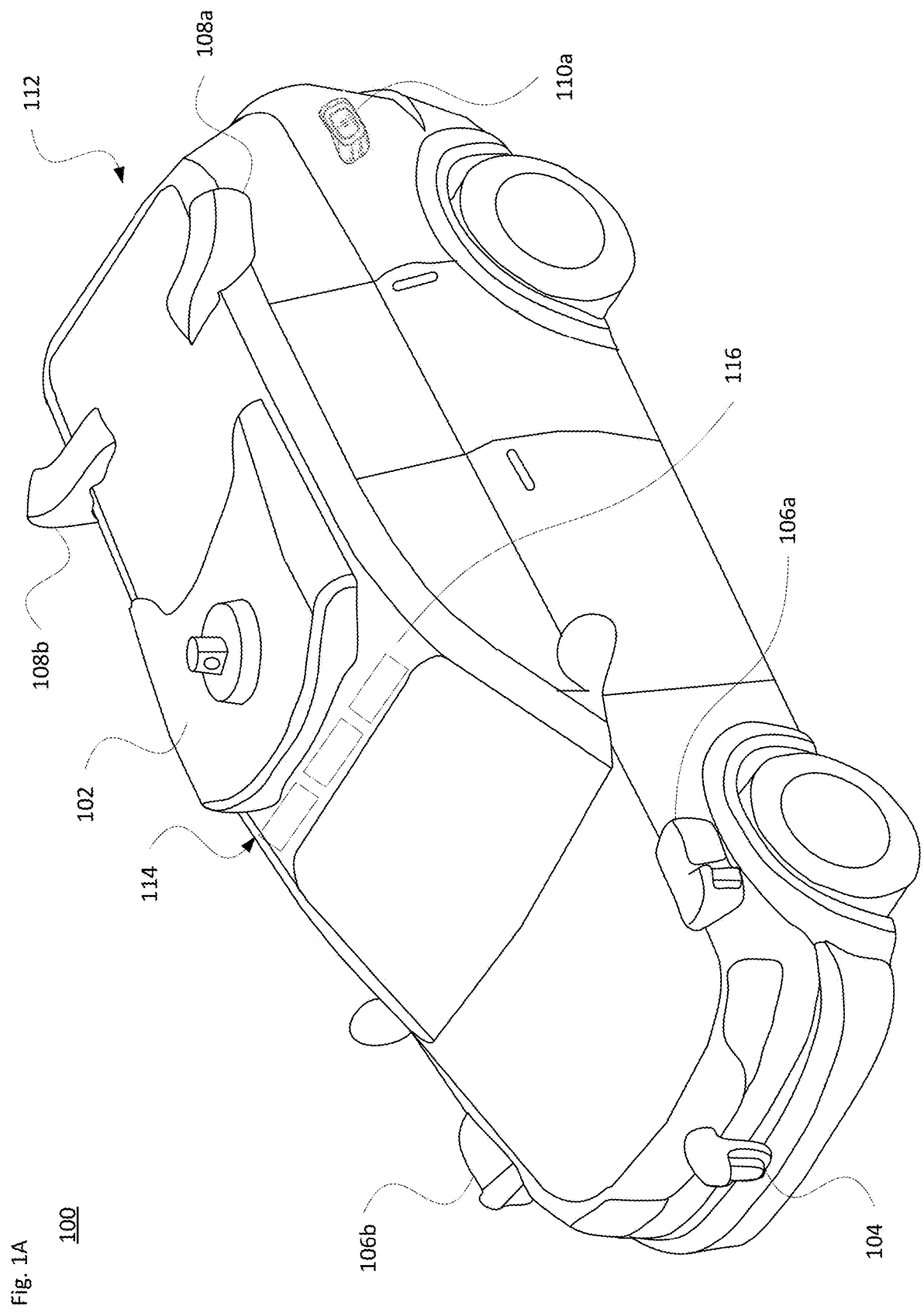
FIGS. 1A-B illustrate an example vehicle configured for use with aspects of the technology.
Figure 1B:
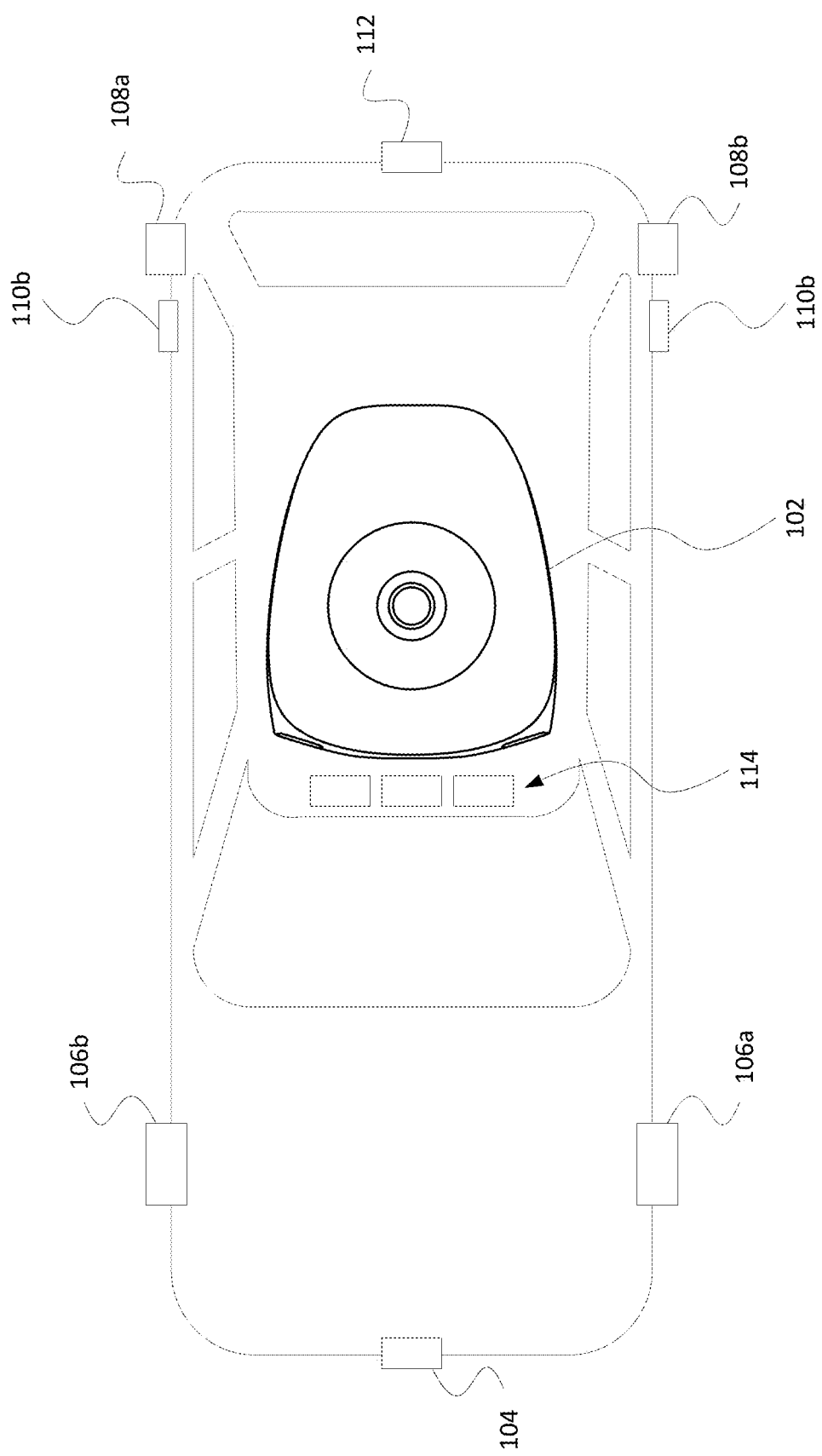

FIG. 1A illustrates a perspective view of a passenger vehicle 100, such as a minivan, sedan or sport utility vehicle. FIG. 1B illustrates a top-down view of the passenger vehicle 100. The passenger vehicle 100 may include various sensors for obtaining information about the vehicle's external environment. For instance, a rooftop housing 102 may include a lidar sensor as well as various cameras, radar units, infrared and/or acoustical sensors. Housing 104, located at the front end of vehicle 100, and housings 106*a*, 106*b* on the driver's and passenger's sides of the vehicle may each incorporate a lidar and/or other sensors. For example, housing 106*a* may be located in front of the driver's side door along a quarterpanel of the vehicle. As shown, the passenger vehicle 100 also includes housings 108*a*, 108*b* for radar units, lidar and/or cameras also located towards the rear roof portion of the vehicle. Other housings 110*a*, 110*b* may be located along the rear quarterpanels, for instance above and behind the rear wheels.

Additional lidar, radar units and/or cameras (not shown) may be located at other places along the vehicle 100. For instance, arrow 112 indicates that a sensor unit (112 in FIG. 1B) may be positioned along the rear of the vehicle 100, such as on or adjacent to the bumper or trunk door/lid. And arrow 114 indicates a series of sensor units 116 arranged along a forward-facing direction of the vehicle. While shown separately, in one example, the sensor units 116 may be integrated into a front-facing section of the rooftop housing 102. In some examples, the passenger vehicle 100 also may include various sensors for obtaining information about the vehicle's interior spaces. The interior sensor(s) may include at least one of a camera sensor, an auditory sensor and an infrared sensor.

Depending on the vehicle type and configuration, more or fewer sensor housings may be disposed around the vehicle. For instance, as shown with the example vehicle 150 of FIG. 1C, similar to vehicle 100 there may be a roof top sensor housing 152, front sensor housing 154, side housings 156*a* and 156*b* along front quarterpanels, side housings 158 along rear quarterpanels, and a rear sensor housing indicated by arrow 160. While certain aspects of the disclosure may be particularly useful in connection with specific types of vehicles, the vehicle may be any type of vehicle including, but not limited to, cars, trucks, motorcycles, buses, recreational vehicles, etc.

FIGS. 1D-E illustrate an example cargo vehicle 170, such as a tractor-trailer truck. The truck may include, e.g., a single, double or triple trailer, or may be another medium or heavy duty truck such as in commercial weight classes 4 through 8. As shown, the truck includes a tractor unit 172 and a single cargo unit or trailer 174. The trailer 174 may be fully enclosed, open such as a flat bed, or partially open depending on the type of cargo to be transported. In this example, the tractor unit 172 includes the engine and steering systems (not shown) and a cab 176 for a driver and any passengers.

The trailer 174 includes a hitching point, known as a kingpin, 178. The kingpin 178 is typically formed as a solid steel shaft, which is configured to pivotally attach to the tractor unit 172. In particular, the kingpin 178 attaches to a trailer coupling 180, known as a fifth-wheel, that is mounted rearward of the cab. For a double or triple tractor-trailer, the second and/or third trailers may have simple hitch connections to the leading trailer. Or, alternatively, each trailer may have its own kingpin. In this case, at least the first and second trailers could include a fifth-wheel type structure arranged to couple to the next trailer.

As shown, the tractor may have one or more sensor units 182, 184 and/or 186 disposed therealong. For instance, one or more sensor units 182 may be disposed on a roof or top portion of the cab 176, and one or more side sensor units 184 may be disposed on left and/or right sides of the cab 176. Sensor units may also be located along other regions of the cab 176, such as along the front bumper or hood area, in the rear of the cab, adjacent to the fifth-wheel, underneath the chassis, etc. The trailer 174 may also have one or more sensor units 186 disposed therealong, for instance along a side panel, front, rear, roof and/or undercarriage of the trailer 174.

As with the sensor units of the passenger vehicle of FIGS. 1A-B, each sensor unit of the cargo vehicle may include one or more sensors, such as lidar, radar, camera (e.g., optical or infrared), acoustical (e.g., microphone or sonar-type sensor), inertial (e.g., accelerometer, gyroscope, etc.) or other sensors (e.g., positioning sensors such as GPS sensors). While certain aspects of the disclosure may be particularly useful in connection with specific types of vehicles, the vehicle may be any type of vehicle including, but not limited to, cars, trucks, motorcycles, buses, recreational vehicles, etc.

Figure 2A:
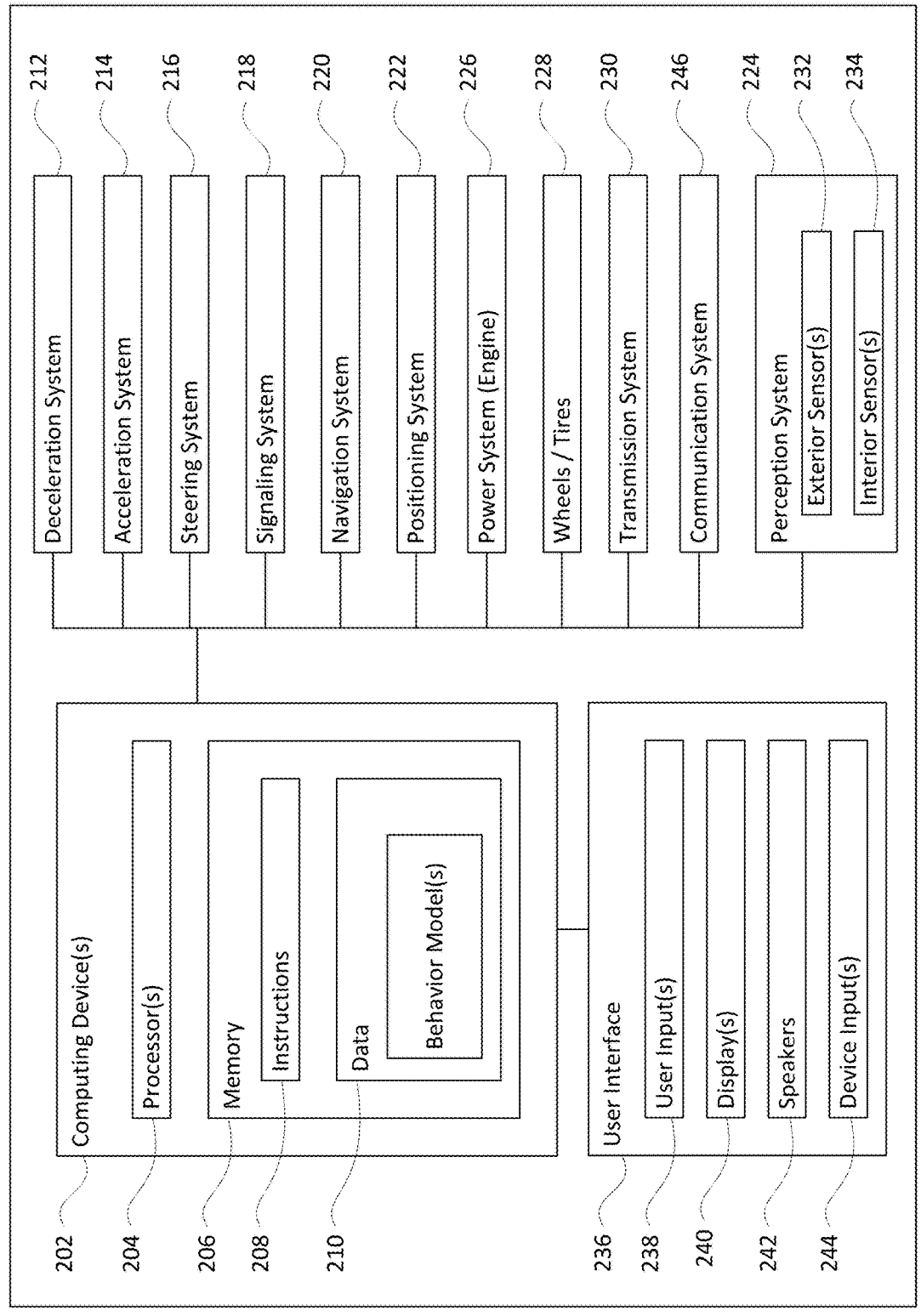
FIG. 2A is a block diagram of systems of an example vehicle in accordance with aspects of the technology.

FIG. 2A illustrates a block diagram 200 with various components and systems of exemplary vehicles, such as vehicles 100 and 150, configured to operate in a fully or semi-autonomous mode of operation. By way of example, there are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional automation that can enable a person in the driver's seat to take control as warranted. In contrast, Level 4 is a high automation level where the vehicle is able to drive without assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as "autonomous" driving modes. Thus, reference to an autonomous driving mode includes both partial and full autonomy.

As illustrated in FIG. 2, the block diagram 200 includes one or more computing devices 202, such as computing devices containing one or more processors 204, memory 206 and other components typically present in general purpose computing devices. The memory 206 stores information accessible by the one or more processors 204, including instructions 208 and data 210 that may be executed or otherwise used by the processor(s) 204. The computing system may control overall operation of the vehicle when operating in an autonomous mode.

The memory 206 stores information accessible by the processors 204, including instructions 208 and data 210 that may be executed or otherwise used by the processor 204. The memory 206 may be of any type capable of storing information accessible by the processor, including a computing device-readable medium. The memory is a non-transitory medium such as a hard-drive, memory card, optical disk, solid-state, etc. Systems may include different combinations of the foregoing, whereby different portions of the instructions and data are stored on different types of media.

The instructions 208 may be any set of instructions to be executed directly (such as machine code) or indirectly (such as scripts) by the processor. For example, the instructions may be stored as computing device code on the computing device-readable medium. In that regard, the terms "instructions", "modules" and "programs" may be used interchangeably herein. The data 210 may be retrieved, stored or modified by one or more processors 304 in accordance with the instructions 208. In one example, some or all of the memory 206 may be an event data recorder or other secure data storage system configured to store vehicle diagnostics, detected sensor data and/or one or more behavior/classification models used in conjunction with object detection and classification, which may be on board the vehicle or remote, depending on the implementation. For instance, the models may be used to classify whether an object is a person (e.g., a pedestrian), a bicycle, a ball or a construction sign that is adjacent to the vehicle. Based on the classification, the system may predict or assign a behavior for that object, and use the classification/behavior when making a driving-related decision. This can include, for instance, alerting a pedestrian next to the vehicle that the vehicle is on and planning to exit a parking spot.

The processors 204 may be any conventional processors, such as commercially available CPUs. Alternatively, each processor may be a dedicated device such as an ASIC or other hardware-based processor. Although FIG. 2 functionally illustrates the processors, memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an autonomous driving computing system incorporated into the vehicle. The autonomous driving computing system may be capable of communicating with various components of the vehicle. For example, the computing devices 202 may be in communication with various systems of the vehicle, including a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle). The autonomous driving computing system may operate in part as a planner, in accordance with the navigation system 220 and the positioning system 222, e.g., for determining a route from a starting point to a destination.

The computing devices 202 are also operatively coupled to a perception system 224 (for detecting objects in the vehicle's environment), a power system 226 (for example, a battery and/or gas or diesel powered engine) and a transmission system 230 in order to control the movement, speed, etc., of the vehicle in accordance with the instructions 208 of memory 206 in an autonomous driving mode which does not require or need continuous or periodic input from a passenger of the vehicle. Some or all of the wheels/tires 228 are coupled to the transmission system 230, and the computing devices 202 may be able to receive information about tire pressure, balance and other factors that may impact driving in an autonomous mode. The power system 226 may have one or more power distribution elements, each of which may be capable of supplying power to selected components and other systems of the vehicle.

The computing devices 202 may control the direction and speed of the vehicle by controlling various components. By way of example, computing devices 202 may navigate the vehicle to a destination location completely autonomously using data from the map information and navigation system 220. Computing devices 202 may use the positioning system 222 to determine the vehicle's location and the perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears, and/or by applying brakes by deceleration system 212), change direction (e.g., by turning the front or other wheels of the vehicle by steering system 216), and signal such changes (e.g., by lighting turn signals of signaling system 218). Thus, the acceleration system 214 and deceleration system 212 may be a part of a drivetrain or other type of transmission system 230 that includes various components between an engine of the vehicle and the wheels of the vehicle. Again, by controlling these systems, computing devices 202 may also control the transmission system 230 of the vehicle in order to maneuver the vehicle autonomously.

Navigation system 220 may be used by computing devices 202 in order to determine and follow a route to a location. In this regard, the navigation system 220 and/or memory 206 may store map information, e.g., highly detailed maps that computing devices 202 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and/or right lane lines or other lane markers that define the boundary of the lane. Thus, most lanes may be bounded by a left edge of one lane line and a right edge of another lane line.

The perception system 224 includes sensor units for detecting objects external to the vehicle. The detected objects may be other vehicles, obstacles in the roadway, traffic signals, signs, trees, pedestrians, bicyclists, etc. As discussed further below, exterior sensor suite 232 includes various housings each having one or more sensors to detect objects and conditions in the environment external to the vehicle. And interior sensor suite 234 may employ one or more other sensors to detect objects and conditions within the vehicle, such as passengers, pets and packages in the passenger compartment, packages or other cargo in the trunk area, etc. For both the exterior sensor suite 232 and the interior sensor suite 234, the housings having different sensors are disposed about the vehicle to provide not only object detection in various environmental conditions, but also to enable rapid classification of detected objects. This allows the vehicle to make effective real time driving decisions.

The raw data from the sensors and the aforementioned characteristics can be processed by the perception system 224 and/or sent for further processing to the computing devices 202 periodically and continuously as the data is generated by the perception system 224. Computing devices 202 may use the positioning system 222 to determine the vehicle's location and perception system 224 to detect and respond to objects when needed to reach the location safely. In addition, the computing devices 202 may perform calibration of individual sensors, all sensors in a particular sensor assembly (housing), or between sensors in different sensor assemblies or other physical housings.

Figure 1C:
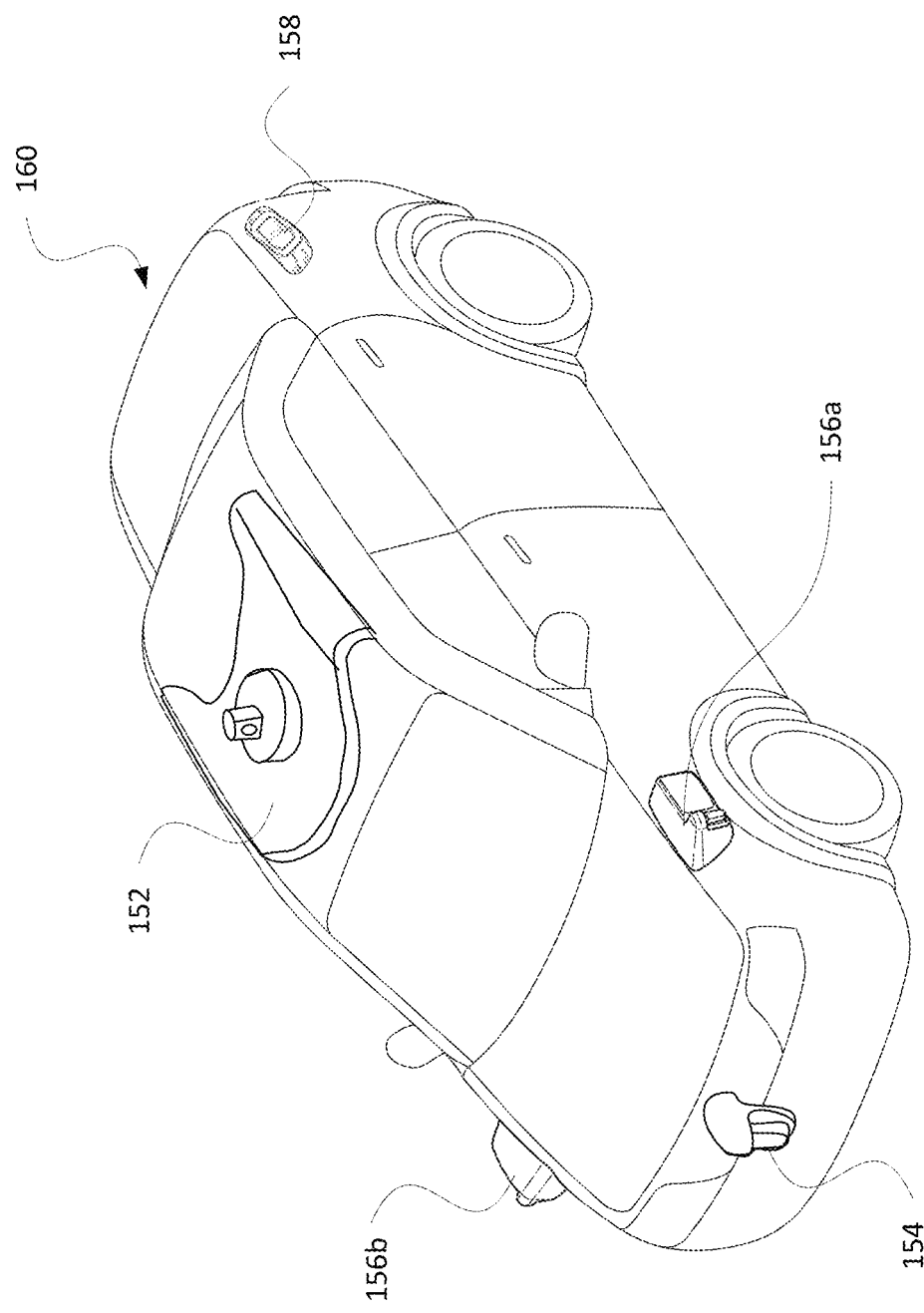
FIG. 1C illustrates another example vehicle configured for use with aspects of the technology.

In one example, an external sensor housing may be arranged as a sensor tower integrated into a side-view mirror on the vehicle. In another example, other sensors may be part of the roof top housing 102 or 152, or other housings as illustrated in FIGS. 1A-C. The computing devices 202 may communicate with the sensor assemblies located on or otherwise distributed along the vehicle. Each assembly may have one or more types of sensors such as those described above.

Returning to FIG. 2, computing devices 202 may include all of the components normally used in connection with a computing device such as the processor and memory described above as well as a user interface subsystem 236. The user interface subsystem 236 may include one or more user inputs 238 (e.g., a mouse, keyboard, touch screen and/or microphone) and one or more display devices 240 (e.g., a monitor having a screen or any other electrical device that is operable to display information). In this regard, an internal electronic display may be located within a cabin of the vehicle (not shown) and may be used by computing devices 202 to provide information to passengers within the vehicle. Other output devices such as speaker(s) 242, and input devices 244 such as touch screen or buttons may also be located within the passenger vehicle.

The vehicle also includes a communication system 246. For instance, the communication system 246 may also include one or more wireless network connections to facilitate communication with other computing devices, such as passenger computing devices within the vehicle, and computing devices external to the vehicle such as in another nearby vehicle on the roadway or a remote server system. The network connections may include short range communication protocols such as Bluetooth™, Bluetooth™ low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Figure 2B:
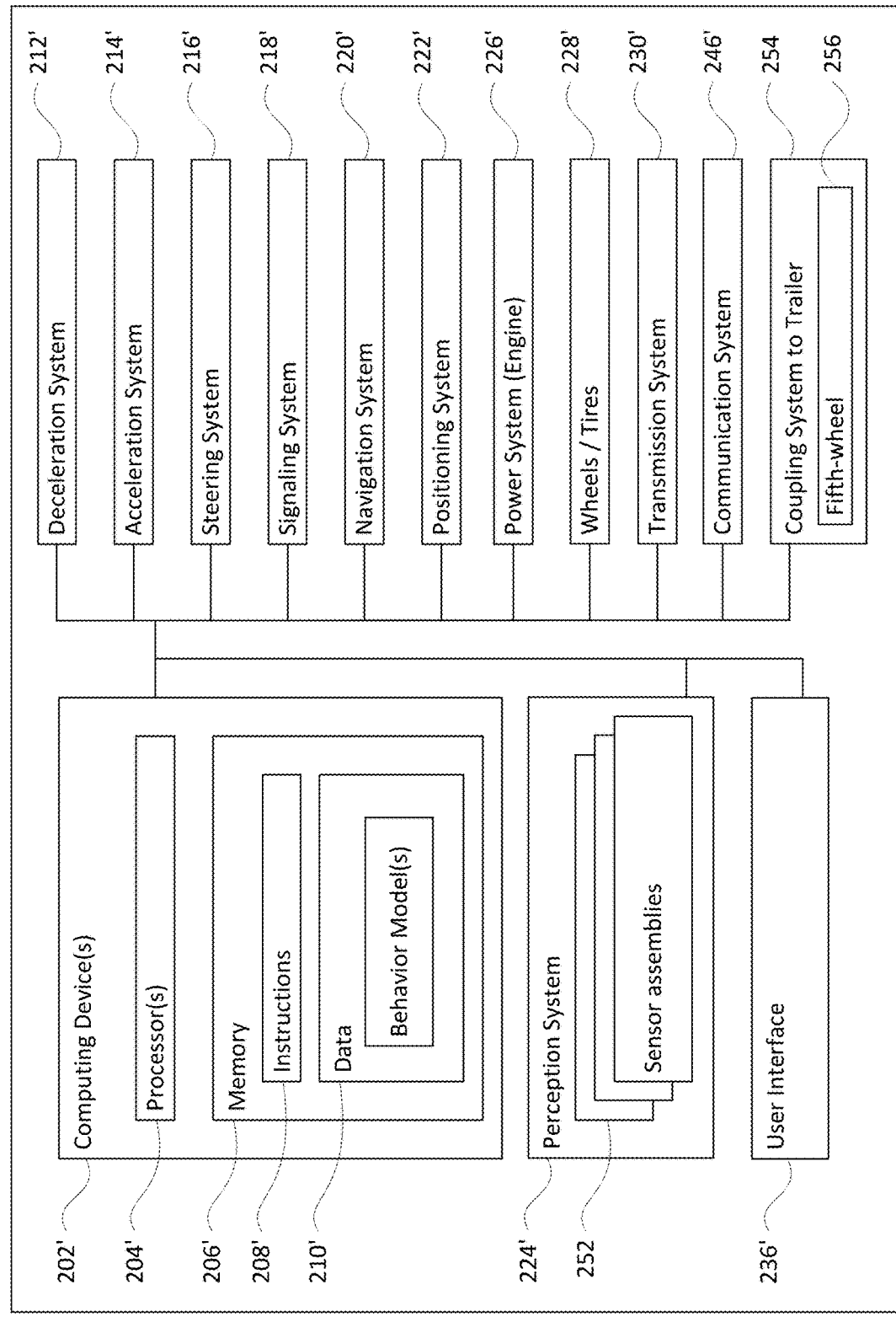
FIGS. 2B-C are block diagrams of systems of an example cargo-type vehicle in accordance with aspects of the technology.

FIG. 2B illustrates a block diagram 250 with various components and systems of a vehicle, e.g., vehicle 170 of FIGS. 1D-E. By way of example, the vehicle may be a truck, farm equipment or construction equipment, configured to operate in one or more partially autonomous modes of operation. As shown in the block diagram 250, the vehicle includes a control system of one or more computing devices similar to that described above, such as computing devices 202' containing one or more processors 204' and memory 206' storing instructions 208' and data 210' such as vehicle diagnostics, detected sensor data and/or one or more behavior/classification models used in conjunction with object detection and classification. In this example, the control system may constitute an electronic control unit (ECU) of a tractor unit of a cargo vehicle.

In one example, the computing devices may form a driving computing system incorporated into vehicle 170. Similar to the arrangement discussed above regarding FIG. 2A, the driving computing system of block diagram 250 may be capable of communicating with various components of the vehicle in order to perform driving operations. For example, the computing devices 202' may be in communication with various systems of the vehicle, such as the driving system including a deceleration system 212', acceleration system 214', steering system 216', signaling system 218', navigation system 220' and a positioning system 222', each of which may function as discussed above regarding FIG. 2A.

The computing devices 302 are also operatively coupled to a perception system 224', a power system 226' and a transmission system 230'. Some or all of the wheels/tires 228' are coupled to the transmission system 230', and the computing devices 202' may be able to receive information about tire pressure, balance, rotation rate and other factors that may impact driving. As with computing devices 202, the computing devices 202' may control the direction and speed of the vehicle by controlling various components. By way of example, computing devices 202' may aid navigating the vehicle to a destination location using data from the map information and navigation system 220'.

Similar to perception system 224, the perception system 224' also includes one or more sensors or other components such as those described above for detecting objects external to the vehicle, objects or conditions internal to the vehicle, and/or operation of certain vehicle equipment such as the wheels and deceleration system 212'. For instance, as indicated in FIG. 2B the perception system 224' includes one or more sensor assemblies 252. Each sensor assembly 252 includes one or more sensors. In one example, the sensor assemblies 252 may be arranged as sensor towers integrated into the side-view mirrors on the truck, farm equipment, construction equipment or the like. Sensor assemblies 252 may also be positioned at different locations on the tractor unit 172 or on the trailer 174, as noted above with regard to FIGS. 1D-E. The computing devices 202' may communicate with the sensor assemblies located on both the tractor unit 172 and the trailer 174. Each assembly may have one or more types of sensors such as those described above.

Also shown in FIG. 2B is a coupling system 254 for connectivity between the tractor unit and the trailer. The coupling system 254 may include one or more power and/or pneumatic connections (not shown), and a fifth-wheel 256 at the tractor unit for connection to the kingpin at the trailer. A communication system 246', equivalent to communication system 246, is also shown as part of vehicle system 250. Similarly, user interface 236', equivalent to user interface 236 may also be included for interactions with the driver and any passengers of the vehicle.

Figure 2C:
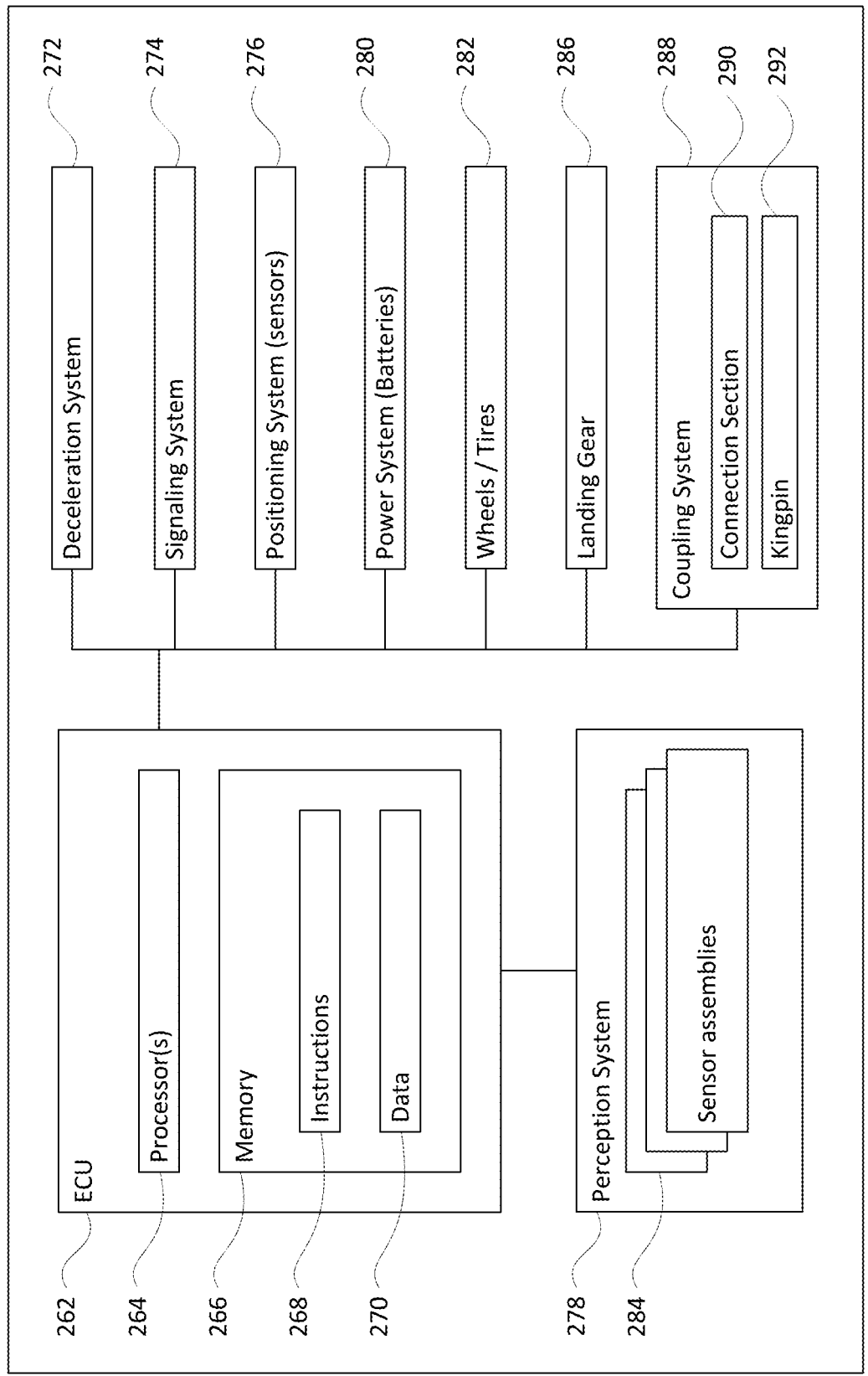

FIG. 2C illustrates an example block diagram 260 of systems of the trailer, such as trailer 174 of FIGS. 1D-E. As shown, the system includes an ECU 262 of one or more computing devices, such as computing devices containing one or more processors 264, memory 266 and other components typically present in general purpose computing devices. The memory 266 stores information accessible by the one or more processors 264, including instructions 268 and data 270 that may be executed or otherwise used by the processor(s) 264. The descriptions of the processors, memory, instructions and data from FIGS. 2A-B apply to these elements of FIG. 2C.

The ECU 262 is configured to receive information and control signals from the trailer unit. The on-board processors 264 of the ECU 262 may communicate with various systems of the trailer, including a deceleration system 272, signaling system 274, and a positioning system 276. The ECU 262 may also be operatively coupled to a perception system 278 with one or more sensors for detecting objects in the trailer's environment and a power system 280 (for example, a battery power supply) to provide power to local components. Some or all of the wheels/tires 282 of the trailer may be coupled to the deceleration system 272, and the processors 264 may be able to receive information about tire pressure, balance, wheel speed and other factors that may impact driving in an autonomous mode, and to relay that information to the processing system of the tractor unit. The deceleration system 272, signaling system 274, positioning system 276, perception system 278, power system 280 and wheels/tires 282, as well as sensor assemblies 284, may operate in a manner such as described above with regard to FIGS. 2A-B.

The trailer also includes a set of landing gear 286, as well as a coupling system 288. The landing gear provide a support structure for the trailer when decoupled from the tractor unit. The coupling system 288, which may be a part of coupling system 254, provides connectivity between the trailer and the tractor unit. Thus, the coupling system 288 may include a connection section 290 (e.g., for power and/or pneumatic links). The coupling system also includes a kingpin 292 configured for connectivity with the fifth-wheel of the tractor unit.

Example Implementations

In view of the structures and configurations described above and illustrated in the figures, various implementations will now be described in accordance with aspects of the technology.

The environment around the vehicle can be viewed as having different quadrants or regions. One example 300 is illustrated in FIG. 3, which shows front, rear, right side and left side regions, as well as adjacent areas for the front right, front left, right rear and left rear areas around the vehicle. These regions are merely exemplary. The vehicle's perception system may cover some or all of the regions around the vehicle to provide as much information as possible about objects in the vehicle's external environment.

For instance, various sensors may be located at different places around the vehicle (see FIGS. 1A-C) to gather data from some or all of these regions. By way of example, the three sensors 116 of FIG. 1 may primarily receive data from the front, front left and front right regions around the vehicle. In contrast, the roof top housing 102 may include other sensors, such as multiple cameras and/or rotating lidar or radar sensors, to provide a 360° field of view (FOV) around the vehicle.

Certain sensors may have different fields of view depending on their placement around the vehicle and the type of information they are designed to gather. For instance, different lidar sensors may be used for near (short range) detection of objects adjacent to the vehicle (e.g., less than 2-10 meters), while others may be used for far (long range) detection of objects a hundred meters (or more or less) in front of the vehicle. Mid-range lidars may also be employed, for instance to detect objects between 10-100 meters from the vehicle. Multiple radar units may be positioned toward the front, rear and/or sides of the vehicle for short or long-range object detection. Cameras may be arranged to provide good visibility around the vehicle. Depending on the configuration, certain sensor housings may include multiple individual sensors with overlapping fields of view. Alternatively, other sensors may provide redundant 360° fields of view.

Figure 4:
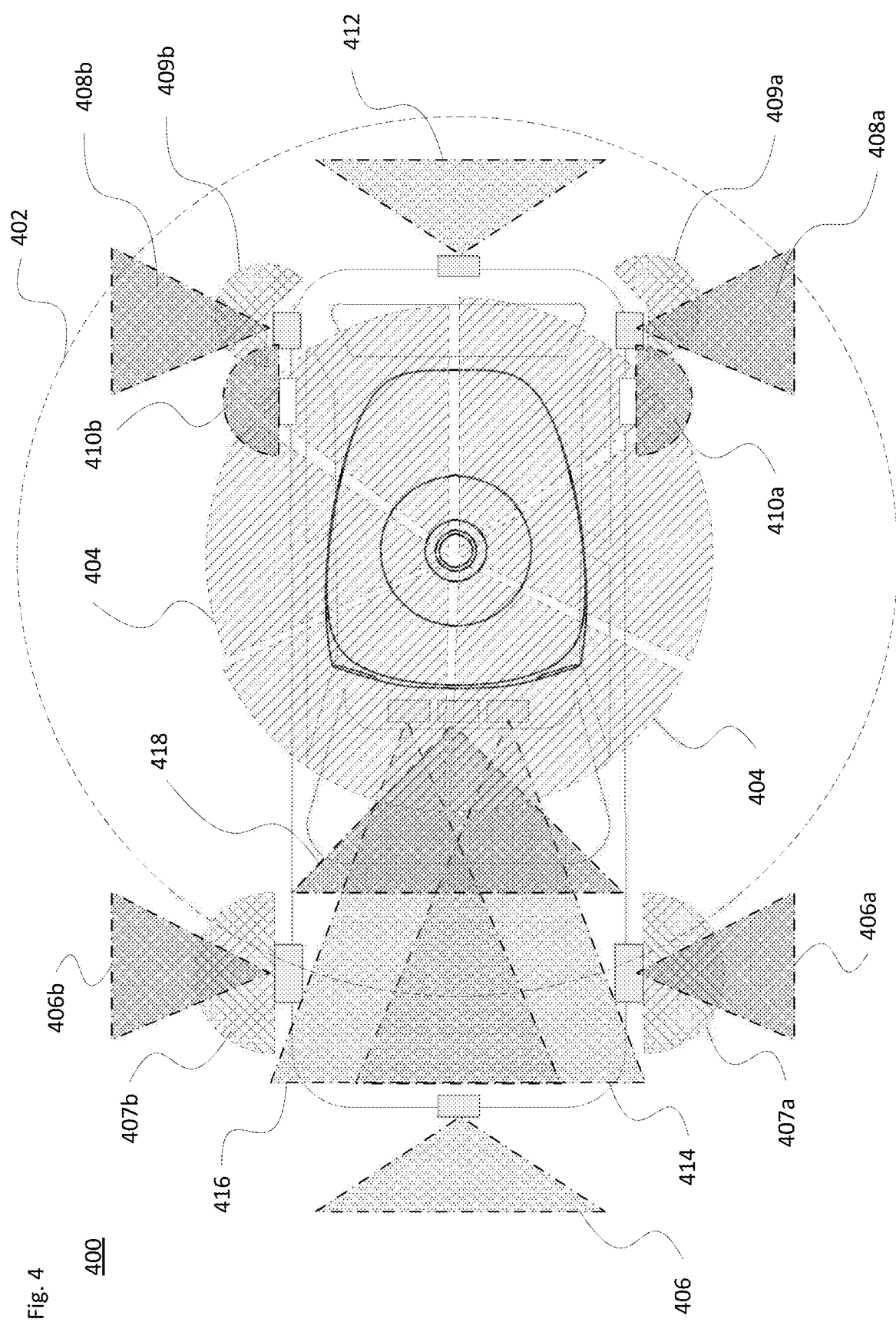
FIG. 4 illustrates example sensor fields of view in accordance with aspects of the disclosure.

FIG. 4 provides one example 400 of sensor fields of view relating to the sensors illustrated in FIGS. 1A-B. Here, should the roof-top housing 102 include a lidar sensor as well as various cameras, radar units, infrared and/or acoustical sensors, each of those sensors may have a different field of view. Thus, as shown, the lidar sensor may provide a 360° FOV 402, while cameras arranged within the housing 102 may have individual FOVs 404, for instance covering one or more regions about the vehicle as shown in FIG. 3. A sensor within housing 104 at the front end of the vehicle has a forward facing FOV 406. The housings 106a, 106b on the driver's and passenger's sides of the vehicle may each incorporate lidar, radar, camera and/or other sensors. For instance, lidars within housings 106a and 106b may have respective FOVs 406a and 406b, while radar units, cameras and/or other sensors within housings 106a and 106b may have a respective FOV 407a and 407b. Similarly, sensors within housings 108a, 108b located towards the rear roof portion of the vehicle each have a respective FOV. For instance, lidars within housings 108a and 108b may have a respective FOV 408 and 408b, while radar units, cameras and/or other sensors within housings 108a and 108b may have a respective FOV 409a and 409b. The sensors in housings 110a and 110b towards the rear of the vehicle may have respective fields of view 410a and 410b. The sensors within housing 112 at the rear end may have a rearward facing FOV 412. And the series of sensor units 116 arranged along a forward-facing direction of the vehicle may have respective FOVs 414, 416 and 418. Each of these fields of view is merely exemplary and not to scale in terms of coverage range. And while only one or two FOVs are shown associated with a given sensor housing, depending on the number of sensors and their configuration, more (or fewer) fields of view may be associated with that sensor housing.

As discussed further below, collocating different types of sensors in the same housing can provide enhanced object detection and enable the onboard system to rapidly classify detected objects. The collocated sensors may be the same or substantially overlapping fields of view, or otherwise provide complementary fields of view.

Example Scenarios

The elevation and orientation of the camera, lidar, radar and/or other sensor subsystems will depend on placement of the various housings on the vehicle, as well as the type of vehicle. For instance, if a sensor housing is mounted on or above the roof of a large SUV (e.g., vehicle 100), the elevation will typically be higher than when the housing is mounted on the roof of a sedan or sports car (e.g., vehicle 150). Also, the visibility may not be equal around all areas of the vehicle due to placement and structural limitations. By varying the placement on the vehicle, a suitable field of view can be obtained for the sensors in each housing. This can be very important for detecting objects immediately adjacent to the vehicle (e.g., within 1-2 meters or no more than 3 meters from the vehicle), as well as for objects farther from the vehicle. There may be requirements for detecting adjacent and remote objects in various scenarios, such as checking the immediate vicinity before pulling out of a parking space, determining whether to make an unprotected left turn, etc.

Close Sensing Camera System

In view of the above, aspects of the technology provide a close sensing camera system as part of the sensor suite for objects within a threshold distance of the vehicle. This camera system is designed to prevent the vehicle from being stuck (when not moving) or acting awkwardly in cases where the self-driving system cannot distinguish between a driveable and non-driveable object within a certain distance of the vehicle. By way of example, the close sensing camera system is configured to provide sensor information for objects within a threshold distance of, e.g., no more than 6-10 meters from the vehicle. In some instances, the threshold distance may be no more than 2-3 meters from the vehicle. This information is used to help detect and classify objects, such as pedestrians standing next to the vehicle, bicycles or motorcycles parked adjacent to the vehicle, and balls, construction signs or other objects that may be in the nearby vicinity.

Lidar sensors may be arranged around the vehicle to minimize blind spots and detect objects. Such sensors are very capable of detecting the presence of objects. However, sensor data from a lidar (e.g., a lidar point cloud) by itself may not be sufficient for the self-driving system to determine what kind of object is present. When it is unclear what type of object is nearby, the vehicle could employ a conservative behavior, such as waiting a few minutes to observe around the vehicle, honk its horn, blink its lights, etc., to see how the object reacts, or backing up or edging forward slowly to obtain a clearer picture of the surroundings. However, this may not provide additional useful information about the object and could irritate or cause confusion for passengers, nearby pedestrians and other road users.

Thus, according to one aspect of the technology, one or more cameras can be arranged with the lidar sensor in a single sensor housing to enable rapid classification of an object, for instance to determine if it is a pedestrian, bicycle or traffic cone. The camera field of view may encompass, and in certain examples be larger than, the lidar field of view. This can be accomplished with one camera or multiple cameras having complementary or otherwise overlapping fields of view. By way of example, a person may be standing or sitting next to the vehicle. This may occur, for instance, when the person exits the vehicle, appears from behind a nearby parked car, or is already in a blind spot before the vehicle turns on or prepares to exit a parking space. Other scenarios where this camera system is beneficial include unprotected turns, high speed lane changes, occlusions of oncoming traffic by other objects, low mounted metering lights (such as at an on-ramp of a freeway), identifying road cones and other construction items, and detecting small foreign object debris (FOD).

Classification of a detected object may include determining the size, proximity and orientation of the detected object. The system is configured so that the cameras are able to see a minimum threshold volume taken up by the object of interest (e.g., at least 50% of a cuboid or other 3D shape). In one example, each camera of the close sensing system is co-located with a companion lidar sensor. For instance, the camera may be no more than 1 foot or 0.3 meters from the lidar sensor, such as to avoid parallax. The camera may be mounted to the vehicle using the same bracket or housing as the lidar, or they may be mounted separately. In general operation, the system FOV should provide a 360° view around the vehicle up to 3 meters away.

The camera resolution should be sufficient to satisfy a threshold classification based on a minimum number of pixels. By way of example, one classification threshold may be the ability to classify a particular object of a selected cuboid shape using no more than 32-64 pixels when the object is within 3 meters of the vehicle. Or, alternatively, the threshold classification may necessitate a camera having a resolution requirement of between 0.1-0.4 mrad/pixel. The threshold classification requirements may vary, for instance depending on the type of object and scenario (e.g., is there an adult or child standing or sitting next to the vehicle, is there a motorcyclist approaching from behind the vehicle over 100 m away, etc.).

Figure 5:
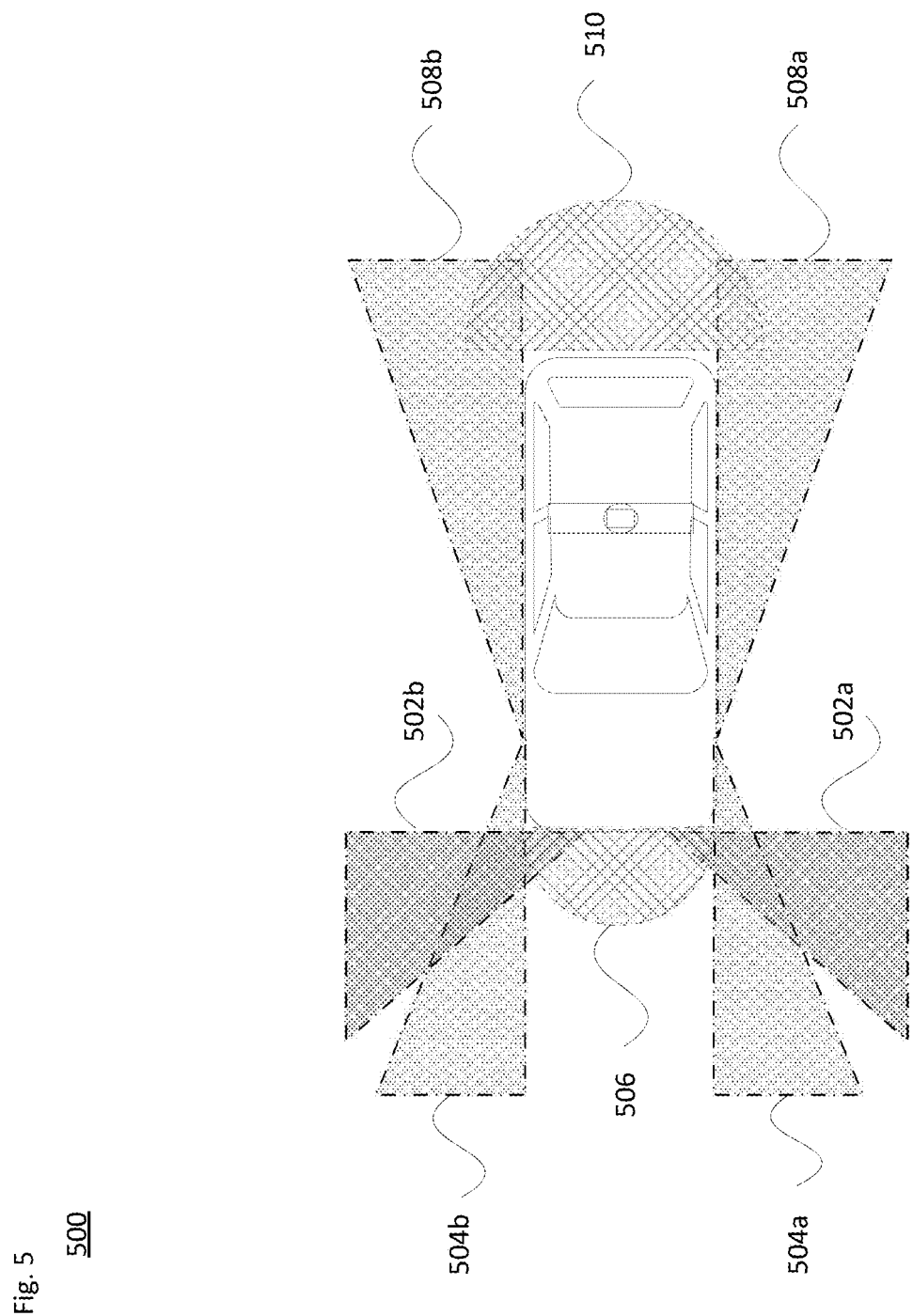
FIG. 5 illustrates example perimeter camera fields of view in accordance with aspects of the disclosure.

The cameras may provide different, and potentially overlapping, zones of coverage, as shown in example 500 of FIG. 5. In this example, up to 8 (or more) cameras may be employed to provide front, side and rear facing FOVs. By way of example, FOVs 502a and 502b encompass portions of the front left and front right regions around the vehicle. FOVs 504a and 504b overlap with FOVs 502a and 502b, providing additional coverage along the front, front left and front right regions. FOV 506 provides covers in the front region of the vehicle. FOVs 508a and 508b provide coverage facing towards the rear of the vehicle, for instance along the left/right regions and rear left and rear right regions. And FOV 510 provides coverage along the rear region of the vehicle.

The camera may be required to operate in all ambient lighting situations. As such, different cameras may rely on illumination from vehicle sources (e.g., the headlights, parking lights, backup lights, running lights) and environmental sources (e.g., other vehicles, streetlights, etc.) Alternatively or additionally, an IR and/or optical light illuminator may be arranged to provide illumination to the camera. For instance, one or more illuminators may be arranged adjacent to the camera on the sensor housing.

By way of example, cameras with front and rear facing FOVs may not require separate illumination, as headlights and brake lights or backup lights may provide sufficient lighting in some scenarios. However, cameras with side FOVs may require supplemental illumination in low-light conditions. Such supplemental lighting may be provided via a near-infrared (NIR) emitter placed near the camera. As discussed further below, in one configuration a pair of "saddle" illuminator modules (for instance NIR modules) may be employed on either side of a camera, where each illuminator module compensates for occlusions of the other module. Alternatively, a single monolithic illuminator module may be used.

Figure 6A:
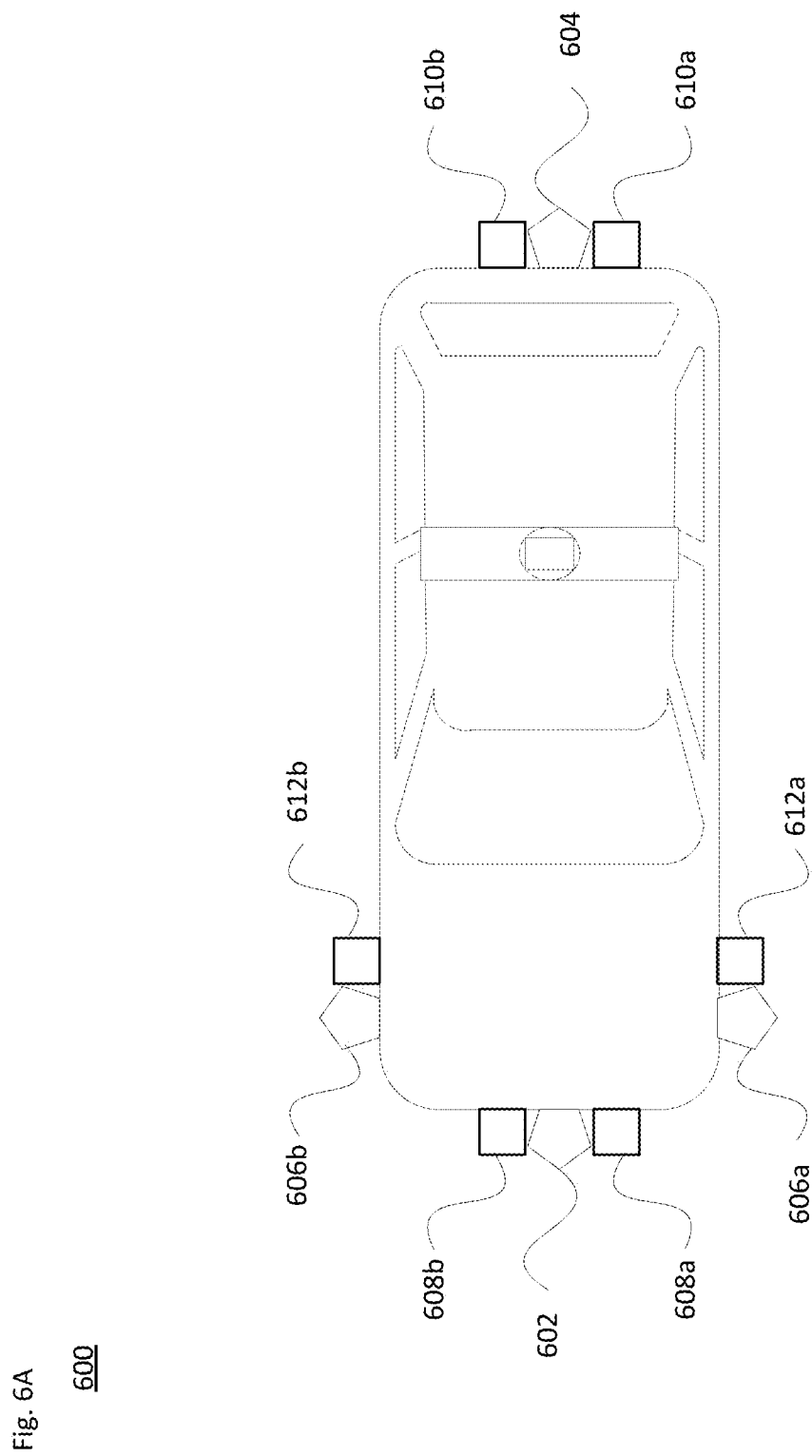
FIGS. 6A-C illustrate example arrangements of perimeter cameras and infrared illuminators in accordance with aspects of the disclosure.
Figure 6B:
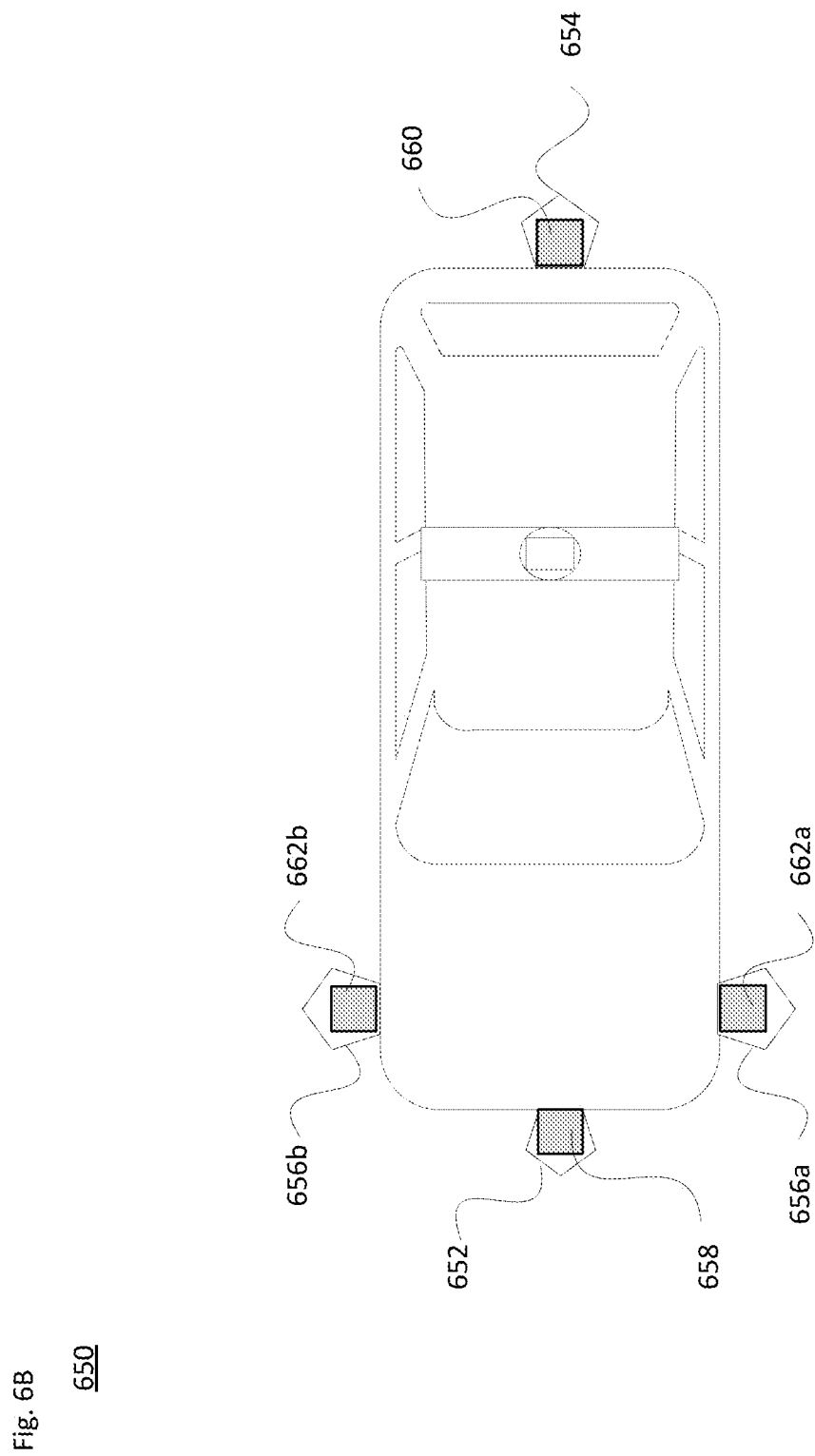
Figure 6C:
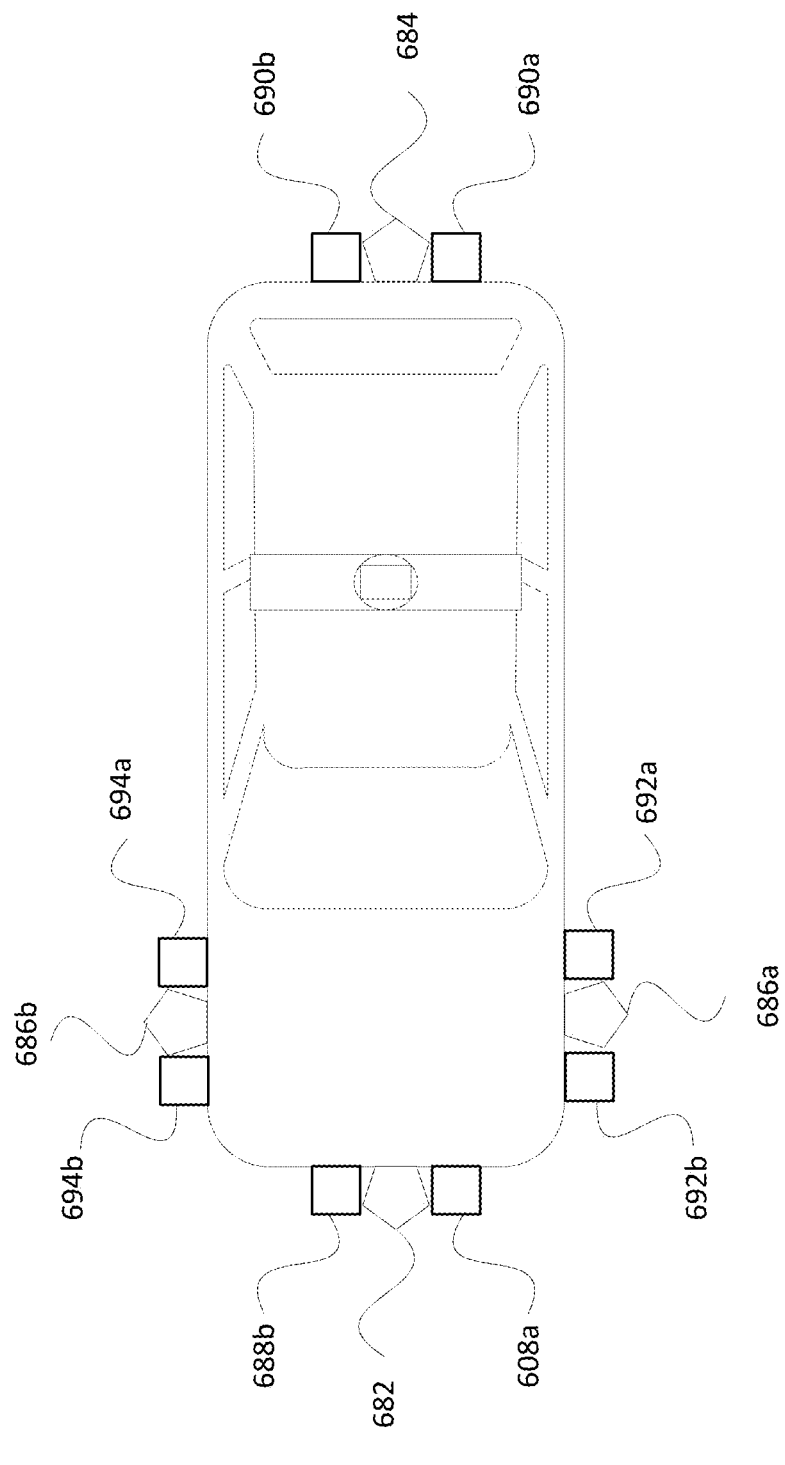

FIGS. 6A-6C illustrate exemplary camera and illuminator configurations. In particular, FIG. 6A illustrates a first configuration 600, in which the illuminators are disposed to the side of the respective cameras. Here, four cameras are shown around the vehicle: front facing camera 602, rear facing camera 604 and left and right side facing cameras 606a and 606b, respectively. As shown, a pair of illuminators 608a and 608b are arranged on either side of front camera 602. Similarly, a pair of saddle illuminators 610a and 610b are arranged on either side of rear camera 604. However, in an alternative configuration, only one illuminator may be arranged to the side of front camera 602 and/or rear camera 604. Side cameras 606a and 606b are shown each having a respective illuminator 612a, 612b disposed to the side thereof. In these examples, the illuminators 612 are positioned rearward of the side cameras 606. Here, the side cameras 606 may receive some illumination from the front illuminators 608a and 608b, which can supplement IR illumination from the illuminators 612a, 612b.

FIG. 6B illustrates a second configuration 650, in which a single illuminator is disposed above the respective camera. As with FIG. 6A, four cameras are shown around the vehicle: front facing camera 652, rear facing camera 654 and left and right side facing cameras 656a and 656b, respectively. As shown, illuminator 658 is disposed above the front camera 652. Similarly, illuminator 660 is disposed above the rear camera 654. Side cameras 656a and 656b are shown each having a respective illuminator 662a, 662b disposed above it. In an alternative configuration, the illuminators could be disposed beneath the respective cameras. In yet another example, the emitter(s) could be placed in other locations around the vehicle that are not co-located with the cameras, such as along the roof. For instance, an illuminator placed on the roof could be used to illuminate the entire field of view of the camera for a given side of the vehicle.

In these examples, a single illuminator module could be placed on any side of the camera. However, there would be some amount of occlusion of part of the projected light. For instance, with a single illuminator module to the side of the camera, there can be a large occlusions of light on the other side of the camera, which can be disadvantageous in low light situations. With a single module above the camera, to reduce occlusion this could necessitate moving the module out above and forward of the camera. In some locations around the vehicle, e.g., in the front and the rear, but on the sides of the vehicle there may be constraints on vehicle width and potential impact of other side sensors. And with a single module below the camera, upward illumination can be decreased due to occlusion. This could impact the ability of the sensor suite to classify nearby objects, such as a person standing next to the vehicle. Thus, it is desirable to put the illuminator module where the field of view of the corresponding camera is the smallest, since this reduces the potential for field of view occlusions. In situations where the vertical field of view is smaller than the horizontal field of view, it may be suitable to place the illuminator on top of and/or beneath the camera. However, this may not be possible in some situations due to other constraints for the sensor suite, vehicle size, etc.

In view of this, FIG. 6C illustrates a third configuration 680, in which pairs of illuminators are disposed to either side of each respective cameras. As with FIGS. 6A-B, four cameras are shown around the vehicle: front facing camera 682, rear facing camera 684 and left and right side facing cameras 686a and 686b, respectively. As shown, a pair of illuminators 688a and 688b are arranged on either side of front camera 602. Similarly, a pair of saddle IR illuminators 690a and 690b are arranged on either side of rear camera 684. In this example, side cameras 686a and 686b are shown each having a respective pair of illuminator 692a, 692b or 694a, 694b disposed to the sides thereof. This arrangement helps to minimize occlusions that can occur when only one illuminator module is placed to the side, top, or bottom of the corresponding camera. FIG. 7F, discussed below, shows one arraignment for the pair of side illuminators for each camera 682, 684 and 686.

In any of these configurations, the camera lens may be coated hydrophobically to repel water. And the cameras may be placed along the vehicle's exterior so that the lenses are easily cleaned using an onboard cleaning system. Such features are discussed further below.

Perimeter Sensor Housings

According to aspects of the technology, housings with integrated sensor assemblies including multiple different sensors (e.g., lidar, camera, radar, etc.) can be located at various places along the vehicle. FIGS. 1A-C illustrate exemplary housing placements for such integrated sensor assemblies. As discussed above, each location provides for specific coverage around the vehicle from its sensors, which have particular fields of view. The arrangement of each sensor along the housing and relative to the other sensors is important, as there may be significant benefits (or drawbacks) to different arrangements. One or more of the sensor housing may have a close sensing camera assembly as described above. Several examples are discussed below.

Figure 7A:
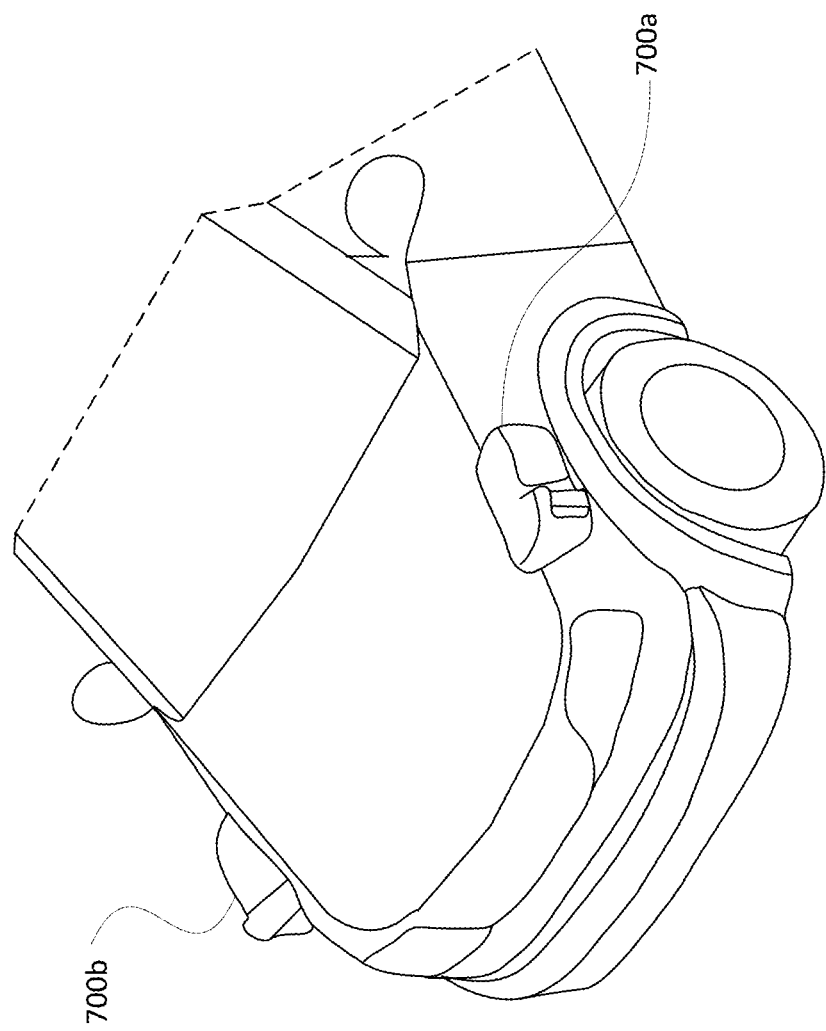
Figure 7F:
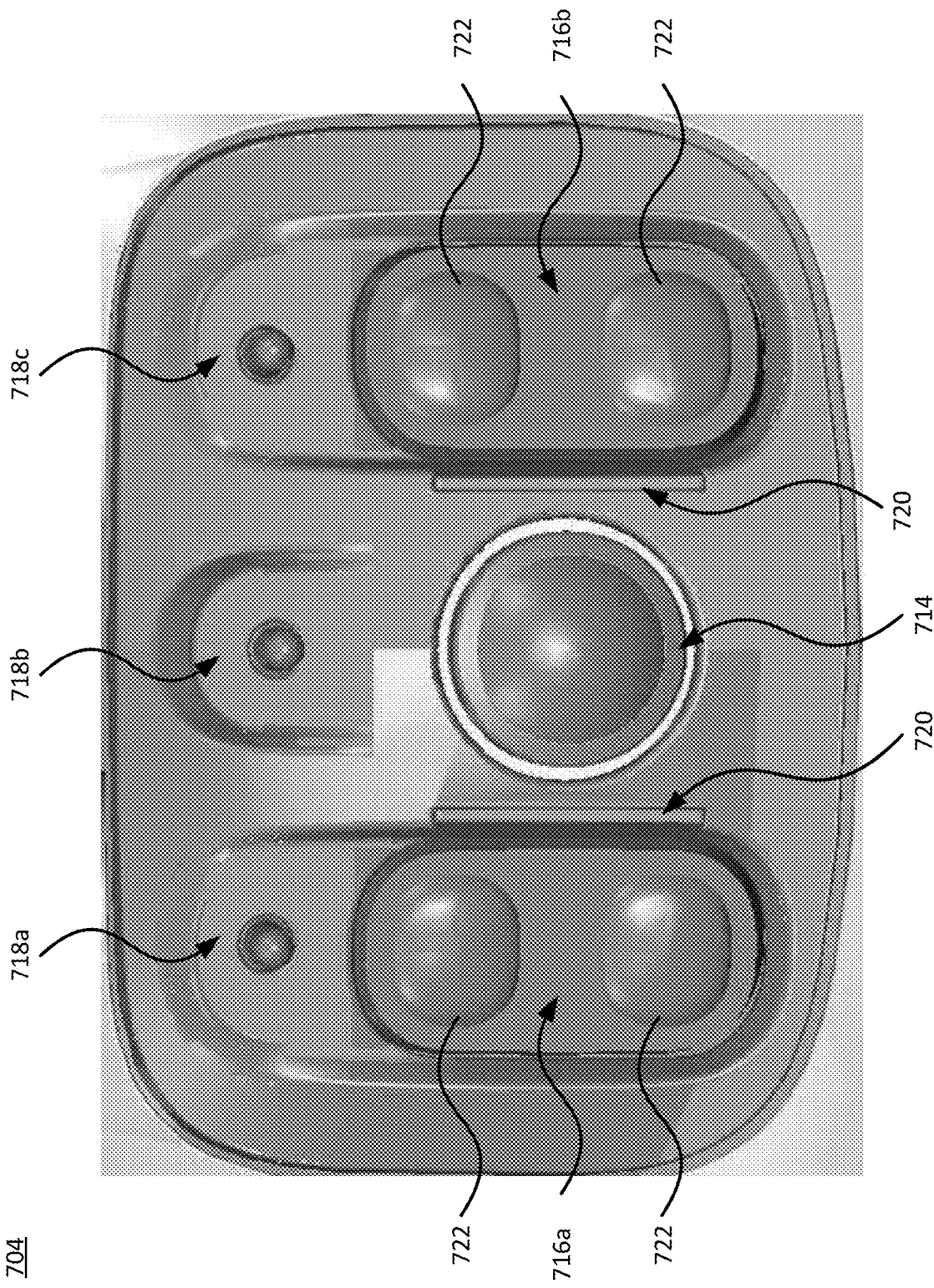

In a first example shown in FIG. 7A, a sensor suite is arranged in a side perimeter housing along the left or right side of the vehicle in front of the driver or passenger side door. In particular, FIG. 7A illustrates a view showing a first housing 700a along the left front quarterpanel and a second housing 700b along the right front quarterpanel. The housing 700b may be a mirror image of the housing 700a. FIGS. 7B-F illustrate various views of a side perimeter housing 700. As shown in the perspective view of FIG. 7B and front view of FIG. 7C, the suite of sensors in the side perimeter housing 700 includes a lidar unit 702, a close sensing camera assembly 704, a radar unit 706, a forward-facing perimeter view camera 708 and a side-facing perimeter view camera 710.

As shown in FIGS. 7B-C, the radar unit 706 is disposed between the front and side-facing cameras on the one side and the lidar and close sensing camera assembly on the other side. Separation between the radar unit and the aligned lidar and close sensing camera assembly avoids interference and potential occlusion.

The close sensing camera assembly 704 is disposed below the lidar unit 702, for instance to enable object classification to supplement object detection by the lidar unit. While shown aligned below the lidar unit 702, the camera of the close sensing camera assembly 704 may be located anywhere within approximately 0.25-0.4 m of the lidar unit 702. In order to avoid parallax, which may adversely impact image classification, the camera should be as close as possible to the lidar unit without creating occlusions between the sensors. And while shown aligned below the lidar unit 702, the camera of the close sensing camera assembly 704 may be disposed above the lidar unit 702. Either arrangement minimizes the likelihood of occlusion and parallax. Spatial constraints of the housing unit and/or the vehicle's overall dimensions may also limit placement of the sensors relative to one another.

As shown in the left and right side views of FIGS. 7D and 7E, respectively, there is a separating surface 712 between the lidar unit 702 and the close sensing camera assembly 704. The separating surface may be arranged at a downward sloping angle. The outward sloping surface allows water, snow, etc., to slide off, which minimizes the likelihood of an obstruction or occlusion of the sensors. As the lidar sensor may have a limited view immediately beneath itself, aligning the camera assembly directly below it the lidar helps with object detection of potentially lidar-occluded objects. For instance, as shown in the side views, the close sensing camera assembly 704 is angled downward to cover the immediate vicinity around the vehicle.

The enlarged view of FIG. 7F illustrates that the assembly 704 includes a camera 714, a pair of illuminator modules 716a and 716b, and a set of cleaning mechanisms 718a, 718b and 718c. Extensions 720 may be included that extend from the housing surface to ensure that there is no leakage of light into the lens of the camera 714. Each module 716a and 716b may include one or more secondary lenses 722, which can be employed to focus the light, e.g., IR light, along one or more desired areas. By way of example, these secondary lenses 722 can increase the width of the field of view for the illuminator module. The cleaning mechanisms 718 may include fluid and/or forced air sprays to clean the camera and/or illuminator modules. Alternatively or additionally, one or more wipers (not shown) may be employed to keep the lenses clean.

FIG. 8 illustrates an example occlusion scenario 800. While the lidar sensor may have a wide coverage azimuth of, e.g., 180°, as shown it may have an occlusion region 802 immediately adjacent to the vehicle that is beneath the lidar sensor, which illustrated as a shaded triangular area. Because the close sensing camera assembly is configured to supplement the perception information obtained by the lidar sensor and is angled downward, it is able to mitigate the lidar sensor's occlusion region 802. For instance, if there is an object adjacent to the front tire, the camera of the close sensing camera assembly is configured to detect it, as shown by the linear elements 804 within the shaded area. While it may not be feasible for the camera to see within a few centimeters to the side of the vehicle, the camera is positioned so that an object that close to the vehicle is at least 50% visible. In one example, the camera may have an azimuth field of view on the order of 170°-200°.

Figure 9:
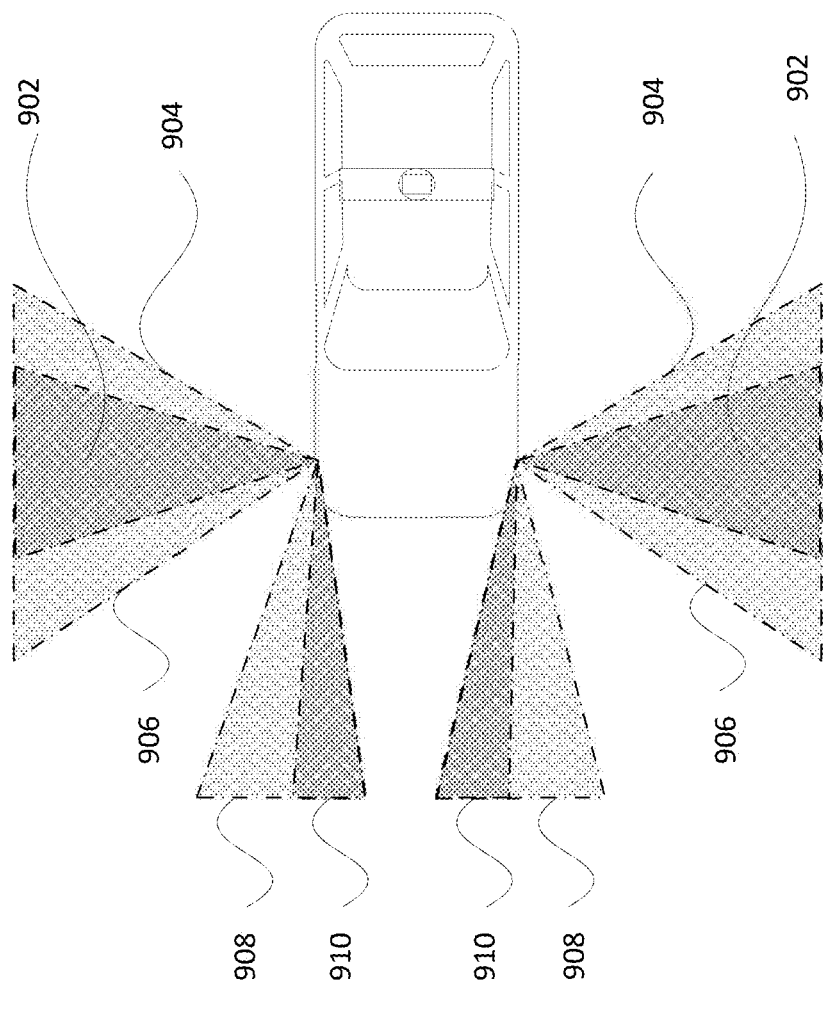
FIG. 9 illustrates an example of perimeter sensor fields of view in accordance with aspects of the disclosure.

Returning to FIG. 7B, as noted above there is a forward-facing perimeter view camera 708 and a side-facing perimeter view camera 710 in the exemplary side perimeter housing 700. These cameras are configured to provide front and side imagery with a minimum azimuth coverage as shown in example 900 of FIG. 9. For instance, the side-facing camera 710 may be configured to provide a minimum of +/−15° FOV 902 to the side of the vehicle, although it may provide up to +/−30-40° or more. In one example, there may be a minimum FOV 904 of 15° toward the rear of the vehicle, and a minimum FOV 906 of 25-35° toward the front of the vehicle. The front-facing camera(s) 708 may have an outer azimuth FOV 908 on the order of 10-20°, and an inner azimuth FOV 910 on the order of 20-40°. In some instances, the driver's side front-facing camera may have a wider FOV than the passenger's side front-facing camera, for instance to provide increased visibility for left hand turns. As illustrated in FIG. 7B, the front-facing camera 708 may be disposed higher (or lower) than the side-facing camera 710. This may be done to accommodate the various sensor units within the housing 700.

This pair of cameras may be used in conjunction with the other sensors, for instance to bolster radar detection and classification in difficult occluded cross traffic and unprotected turn scenarios. In one scenario, the cameras 708 and 710 are not primarily used for close-in sensing, and use ambient light without an IR illuminator. The side-facing perimeter view camera 710 may be located as far forward in the housing 700 or elsewhere on the vehicle to reduce the likelihood of being occluded while the vehicle inches into an intersection or is making a tight turn. The front-facing perimeter view camera 708 may also be located as far forward as possible to better see around occluding objects in front of the vehicle.

Figure 10:
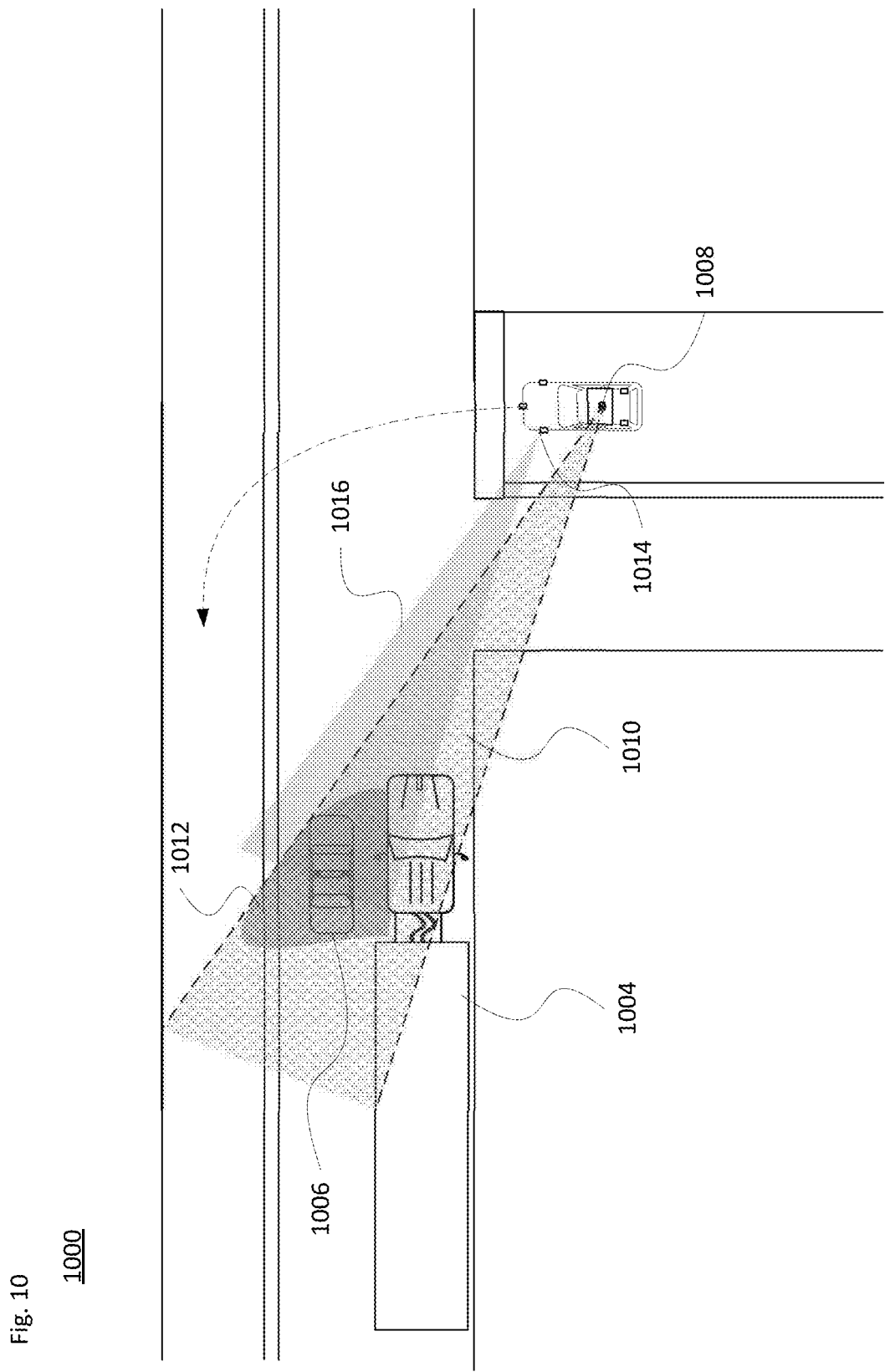
FIG. 10 illustrates an example occlusion scenario in accordance with aspects of the technology.

FIG. 10 illustrates an occlusion example for a turn scenario 1000. In this scenario, vehicle 1002 is preparing to make a left turn as shown by the dashed arrow. Here, a truck 1004 or other object may occlude another vehicle 1006 from the field of view of one of the sensors on the vehicle 1002. For instance, a roof-mounted sensor 1008 may have a FOV 1010, that is partially occluded in region 1012 by the truck 1004. However, a perimeter-facing camera 1014 has a different FOV 1016 that is able to see at least part of the other vehicle 1006. The perimeter-facing cameras are beneficial in a wide variety of other scenarios, such as maneuvering around another vehicle such as when there may be oncoming traffic, seeing adjacent lanes rearward when there is an occluding vehicle behind the autonomous vehicle, when merging into high speed traffic such as via an on-ramp of a freeway.

Figure 11C:
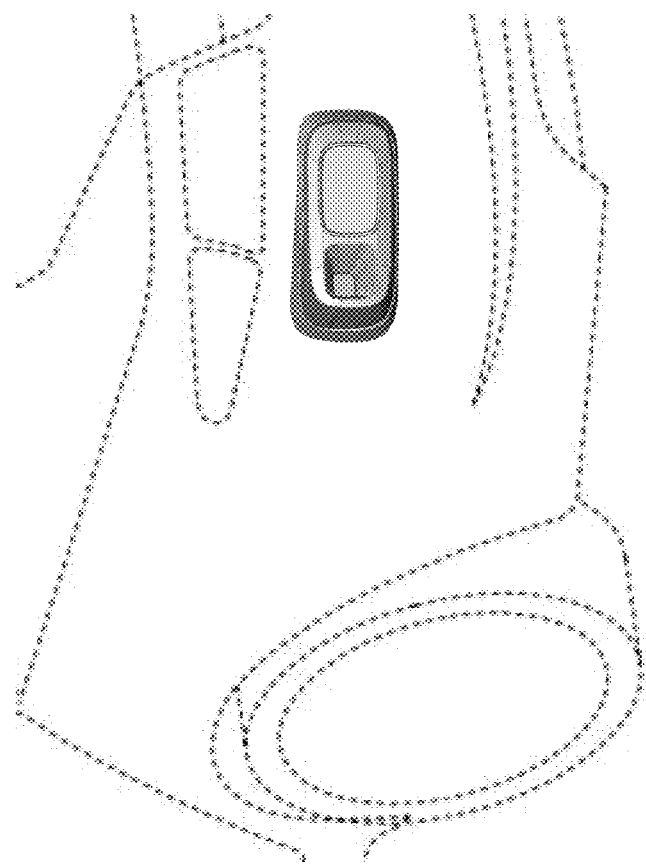

Another example of a perimeter housing assembly is shown in FIGS. 11A-C. In particular, FIGS. 11A-B illustrate a rear housing assembly 1100, which is shown in an example position 1110 on the rear fascia of a sedan or other vehicle in FIG. 11C. While the position 1110 is shown on the rear left side of the vehicle, another rear housing assembly may also be disposed on the right side of the vehicle. As indicated in FIGS. 11A-B, a first sensor 1102 and a second sensor 1104 are disposed in the housing 1100. By way of example, the first sensor 1102 is a radar sensor and the second sensor is a camera. These sensors are able to provide information about other vehicles approaching from the rear, for example to account for high speed lane changes to the right or left.

Figure 12:
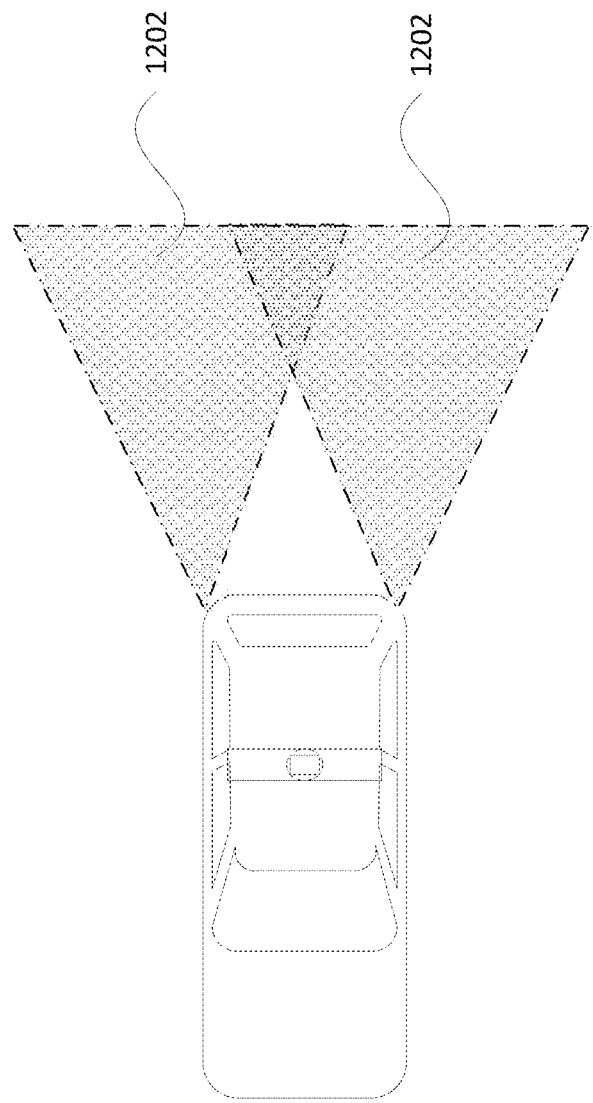
FIG. 12 illustrates an example sensor arrangement to minimize occlusions in accordance with aspects of the disclosure.
Figure 13:
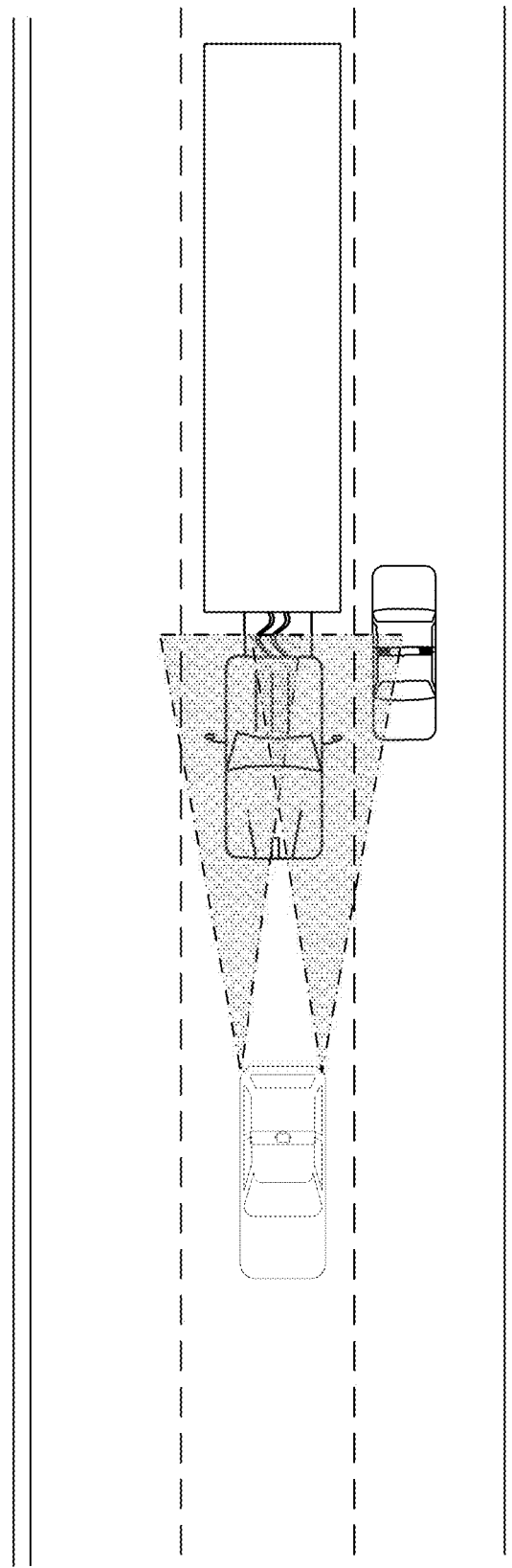
FIG. 13 illustrates an example of perimeter sensor fields of view in accordance with aspects of the disclosure.

As shown in example 1200 of FIG. 12, the rear-facing perimeter view cameras are configured to provide rear imagery with a minimum azimuth coverage. For instance, the rear-facing camera 1100 may be configured to provide between 30-60° FOV 1202 to the rear of the vehicle. By way of example, the rear-facing camera may have an outer azimuth on the order of 15-35° (e.g., to see cars approaching in adjacent lanes), and an inner azimuth the order of 10-25° (e.g., to see following vehicles in the same lane). FIG. 13 illustrates a scenario 1300, showing that the rear-facing camera is able to see the car approaching in the adjacent (left) lane that would otherwise be occluded by the truck.

Figure 14A:
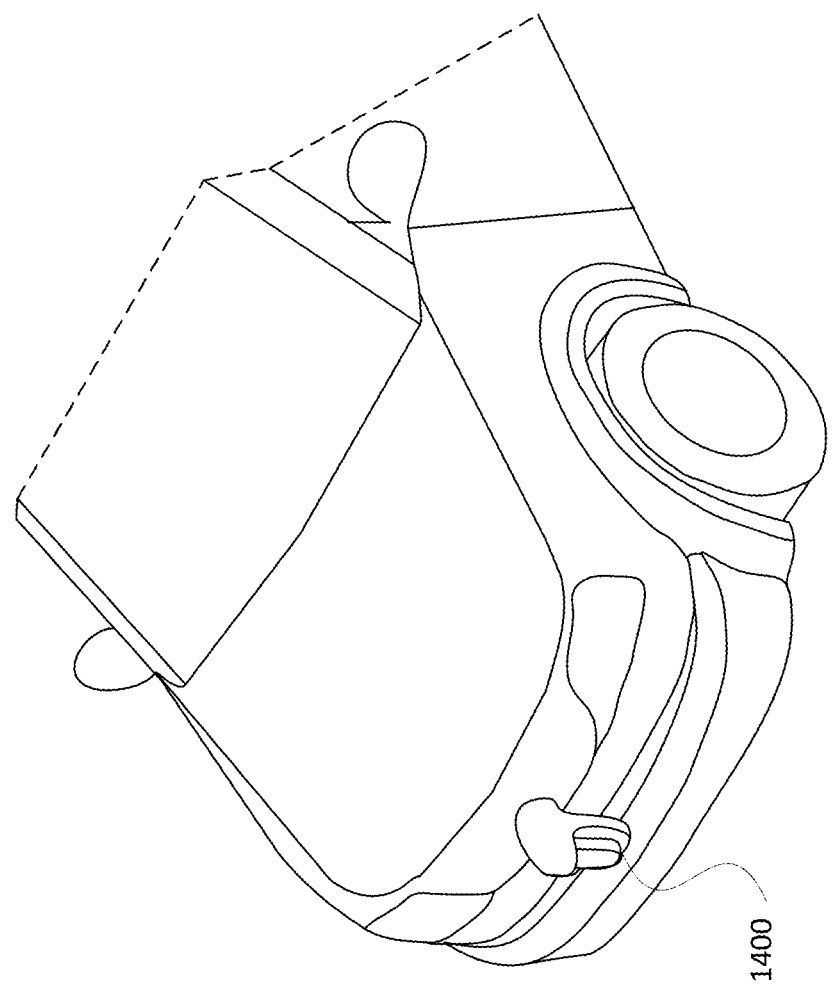
Figure 14C:
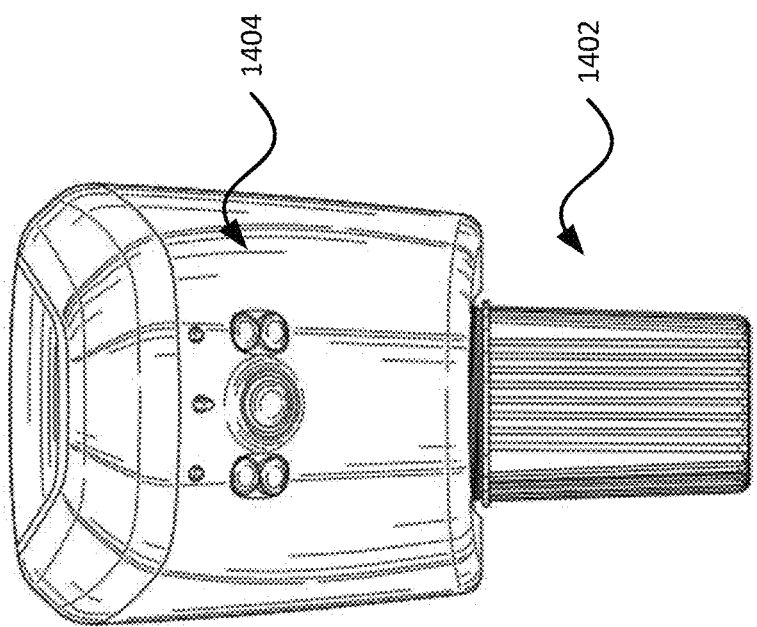
Figure 14B:
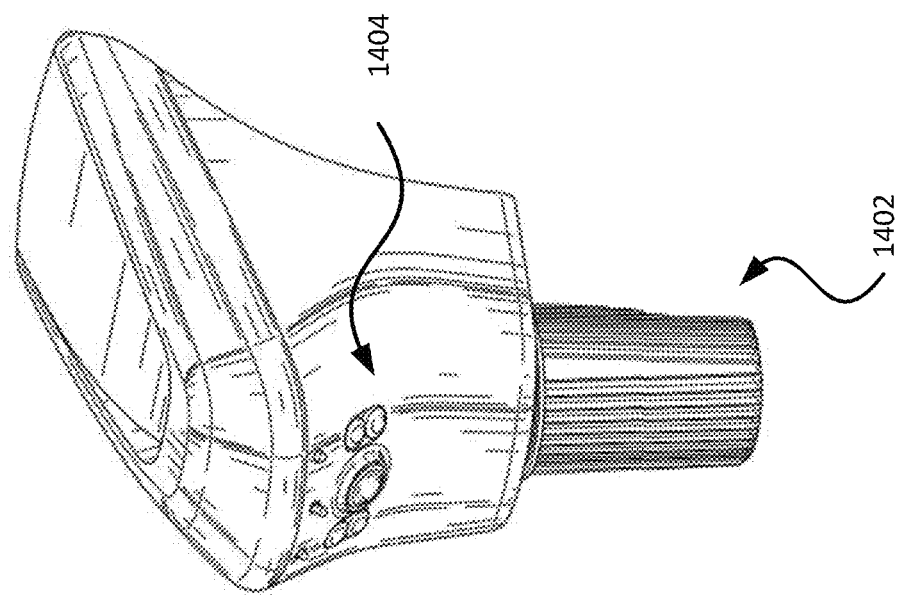

In another example shown in FIG. 14A, a front sensor housing 1400 is arranged along or adjacent to the front bumper, for instance to detect and classify objects directly in front of the vehicle. FIGS. 14B-E illustrate various views of the front sensor housing 1400. As shown in the perspective view of FIG. 14B and front view of FIG. 14C, the suite of sensors in the front sensor housing 1400 includes a lidar unit 1402 and a close sensing camera assembly 1404.

The close sensing camera assembly 1404 is disposed directly above the lidar unit 1402, for instance to enable object classification to supplement object detection by the lidar unit. While shown aligned above the lidar unit 1402, the camera of the close sensing camera assembly 1404 may be located anywhere within approximately 0.25-0.4 m of the lidar unit 1402. In order to avoid parallax, which may adversely impact image classification, the camera should be as close as possible to the lidar unit without creating occlusions between the sensors. And while shown above the lidar unit 1402, the camera of the close sensing camera assembly 1404 may be disposed below the lidar unit 1402. Either arrangement minimizes occlusion. Spatial constraints of the housing unit and/or the vehicle's overall dimensions may also limit placement of the sensors.

Figure 14D:
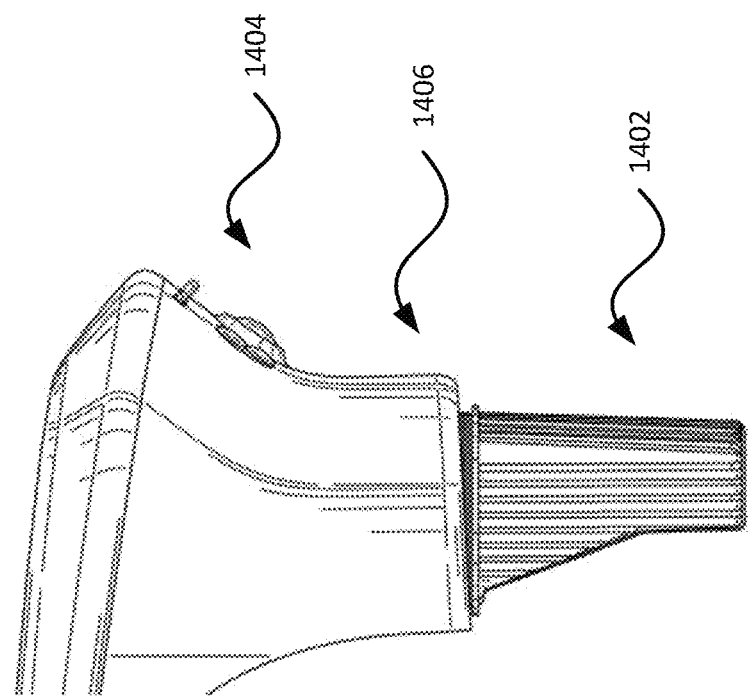

As shown in the side view of FIG. 14D, there is a separating surface 1406 between the lidar unit 1402 and the close sensing camera assembly 1404. The separating surface may be arranged at an angle, e.g., to allow water, snow, etc., to slide off, which minimizes the likelihood of an obstruction or occlusion of the sensors. Also shown in the side view, the close sensing camera assembly 1404 is angled downward to cover the immediate vicinity around the vehicle. The enlarged view of FIG. 14E illustrates that the assembly 1404 includes a camera 1408, a pair of illuminator modules 1410a and 1410b, and a set of cleaning mechanisms 1412a, 1412b and 1412c. Extensions 1414 may be included that extend from the housing surface to ensure that there is no leakage of light into the lens of the camera 1408. As shown, each module 1410a and 1410b may include one or more secondary lenses 1416, which can be employed to focus the light along one or more desired areas. The cleaning mechanisms 1412 may include fluid and/or forced air sprays to clean the camera and/or illuminator modules.

Figure 15:
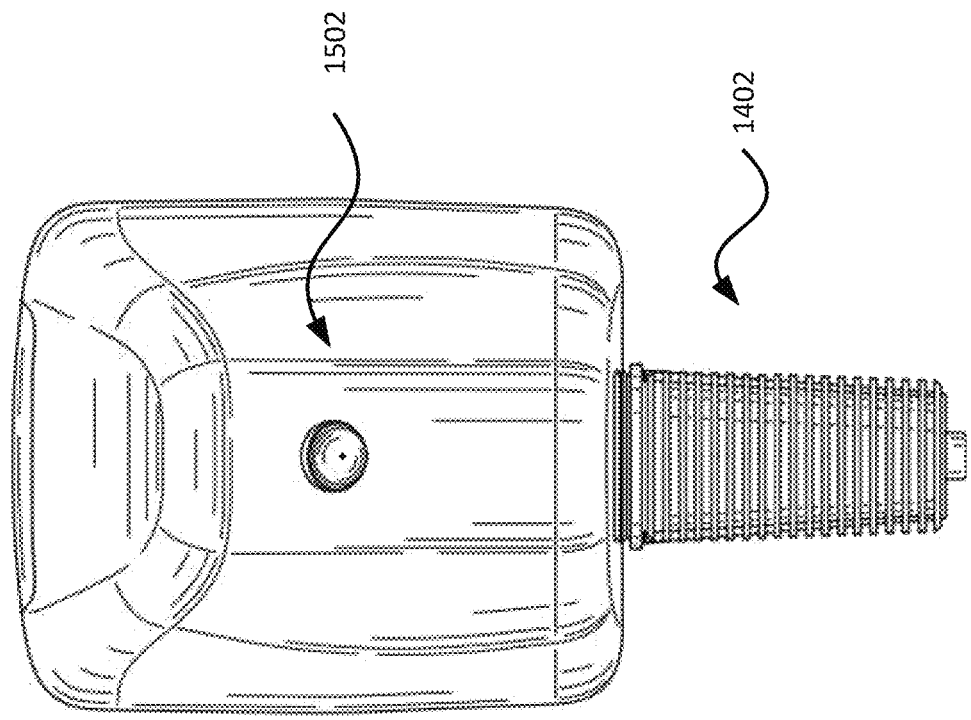
FIG. 15 illustrates a variation of the perimeter sensor housing assembly of FIGS. 14A-E.

FIG. 15 illustrates a variation 1500 of front sensor housing 1400. In this variation, the housing 1500 includes lidar unit 1402 and a close sensing camera 1502, which omits the IR illumination modules and cleaning mechanisms. In another variation without illumination, the cleaning mechanisms can be included. Similarly, in a further variation without cleaning mechanisms, illumination can be included.

Figure 16A:
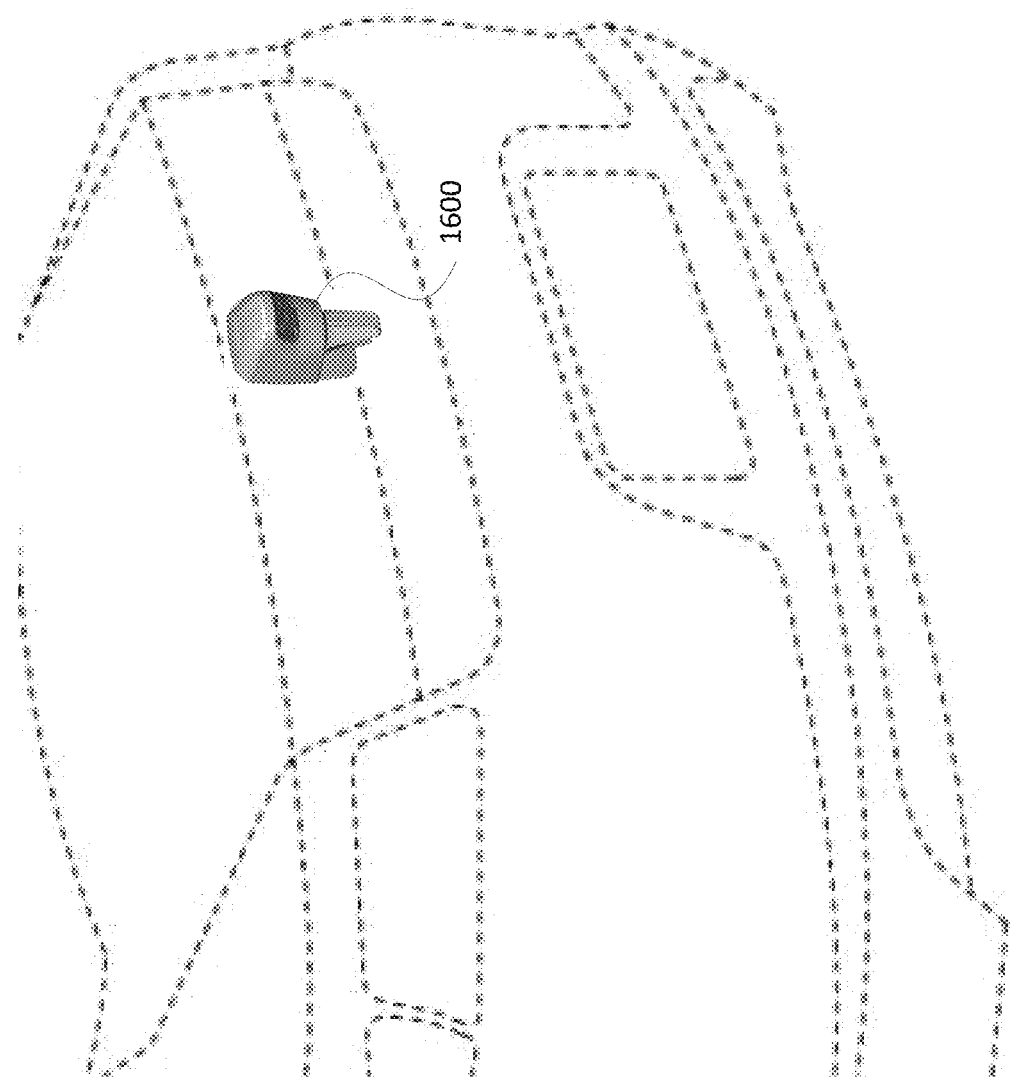
FIGS. 16A-E illustrate yet another example perimeter sensor housing assembly in accordance with aspects of the disclosure.
Figure 16C:
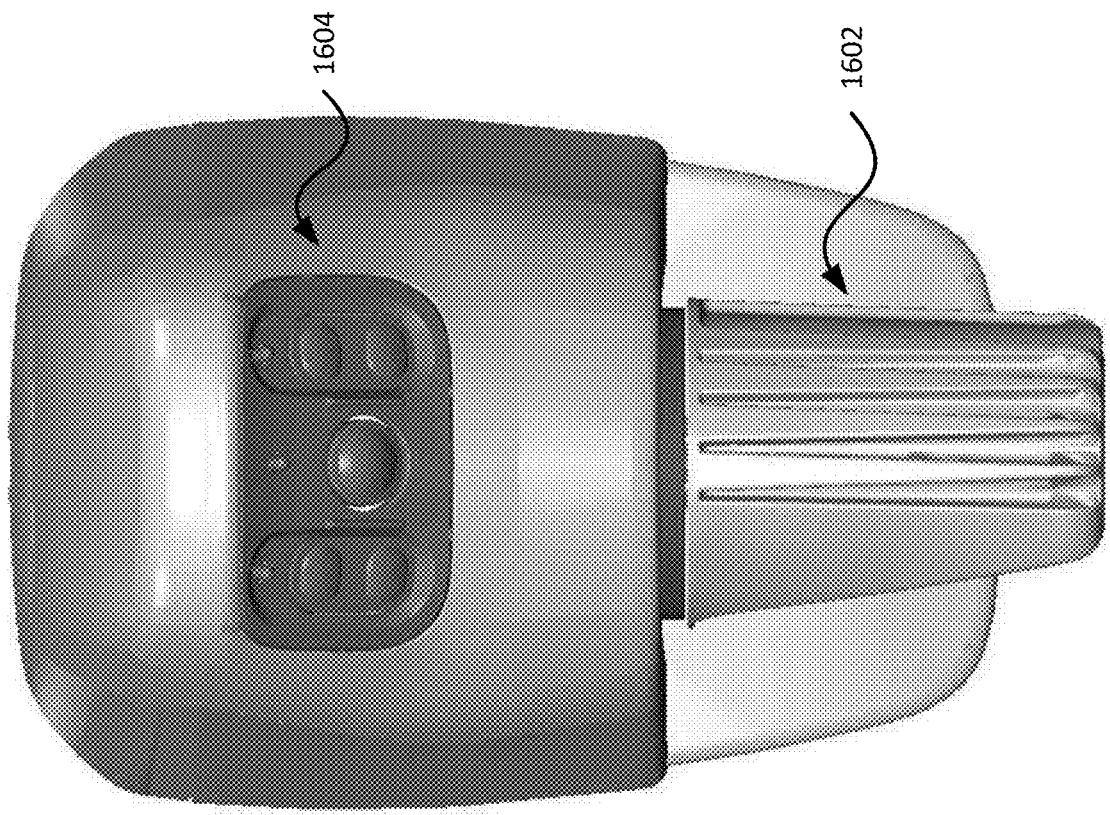
Figure 16B:
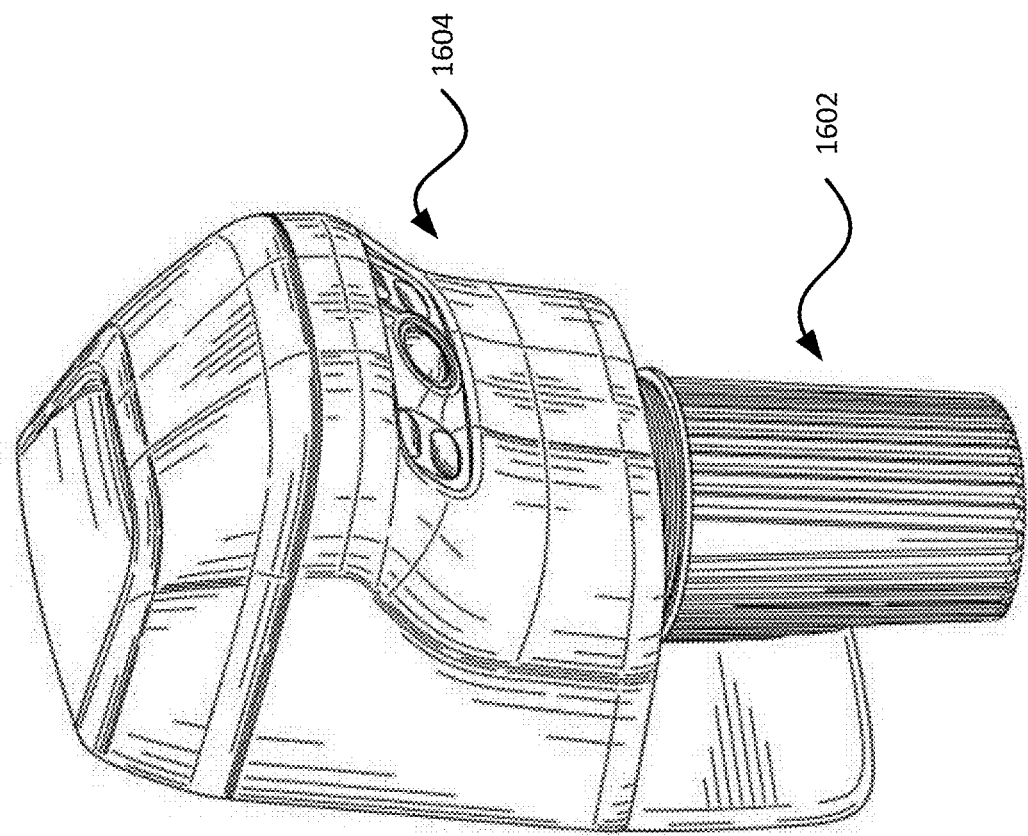

In another example shown in FIG. 16A, a rear sensor housing 1600 is arranged along or adjacent to the rear bumper, for instance to detect and classify objects directly behind the vehicle. FIGS. 16B-E illustrate various views of the rear sensor housing 1600. As shown in the perspective view of FIG. 16B and front view of FIG. 16C, the suite of sensors in the front sensor housing 1600 includes a lidar unit 1602 and a close sensing camera assembly 1604.

The close sensing camera assembly 1604 is disposed directly above the lidar unit 1602, for instance to enable object classification to supplement object detection by the lidar unit. While shown aligned above the lidar unit 1602, the camera of the close sensing camera assembly 1604 may be located anywhere within approximately 0.25-0.4 m of the lidar unit 1602. In order to avoid parallax, which may adversely impact image classification, the camera should be as close as possible to the lidar unit without creating occlusions between the sensors. And while shown above the lidar unit 1602, the camera of the close sensing camera assembly 1604 may be disposed below the lidar unit 1602. Either arrangement minimizes occlusion. Spatial constraints of the housing unit and/or the vehicle's overall dimensions may also limit placement of the sensors.

Figure 16D:
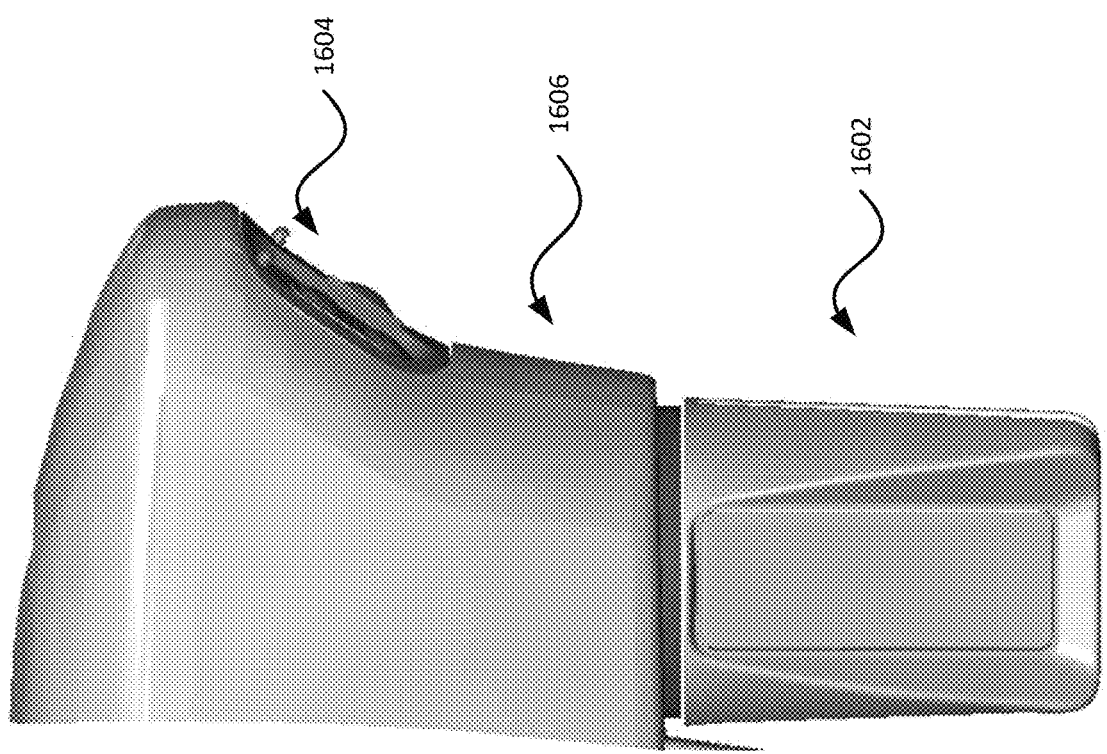
Figure 16E:
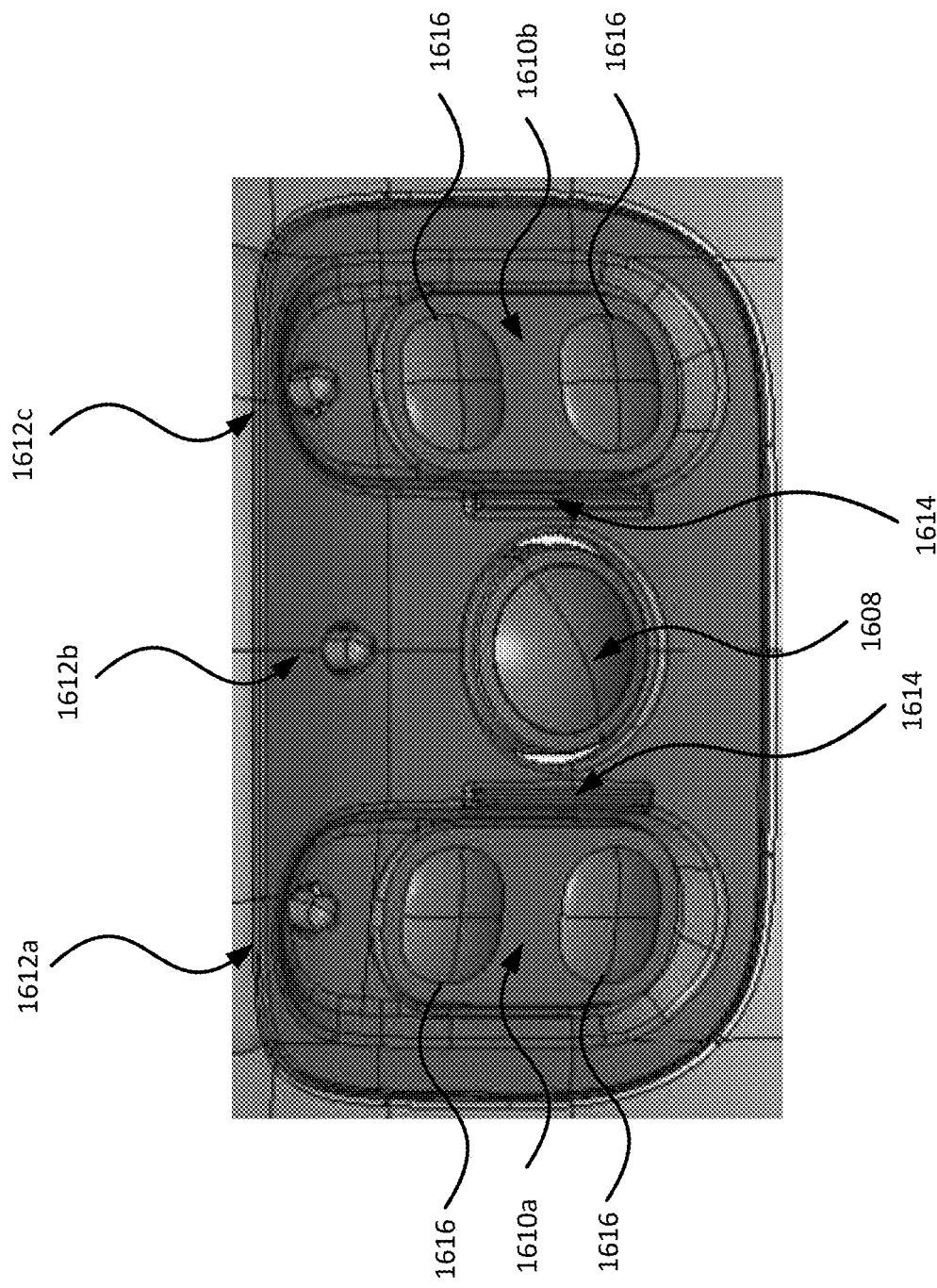

As shown in the side view of FIG. 16D, there is a separating surface 1606 between the lidar unit 1602 and the close sensing camera assembly 1604. The separating surface may be arranged at an angle, e.g., to allow water, snow, etc., to slide off, which minimizes the likelihood of an obstruction or occlusion of the sensors. Also shown in the side view, the close sensing camera assembly 1604 is angled downward to cover the immediate vicinity around the vehicle. The enlarged view of FIG. 16E illustrates that the assembly 1604 includes a camera 1608, a pair of illuminator modules 1610a and 1610b, and a set of cleaning mechanisms 1612a, 1612b and 1612c. Extensions 1614 may be included that extend from the housing surface to ensure that there is no leakage of light into the lens of the camera 1608. As shown, each module 1610a and 1610b may include one or more secondary lenses 1616, which can be employed to focus the light along one or more desired areas. The cleaning mechanisms 1612 may include fluid and/or forced air sprays to clean the camera and/or illuminator modules.

Figure 17:
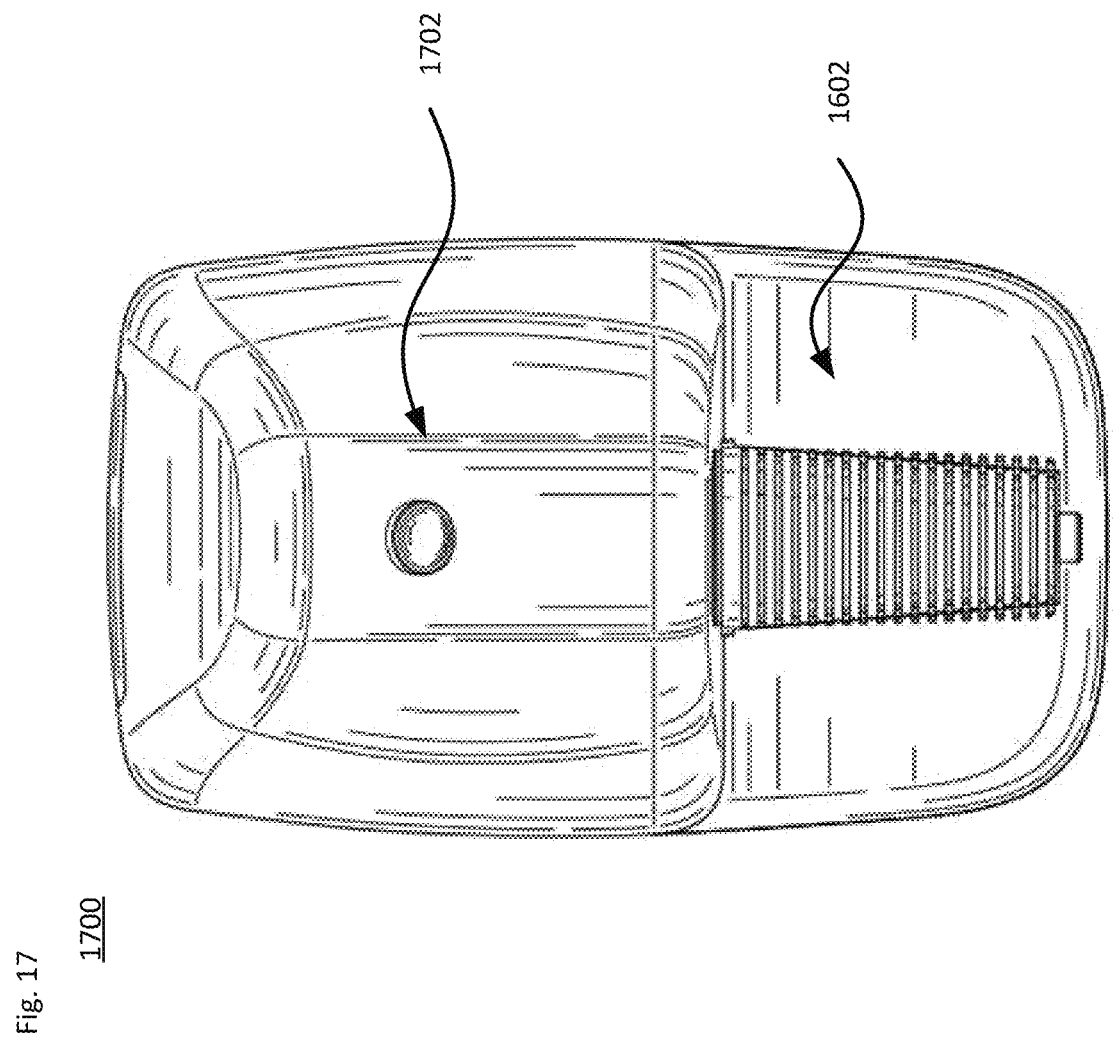
FIG. 17 illustrates a variation of the perimeter sensor housing assembly of FIGS. 16A-E.

FIG. 17 illustrates a variation 1700 of front sensor housing 1600. In this variation, the housing 1700 includes lidar unit 1602 and a close sensing camera 1702, which omits the illumination modules and cleaning mechanisms. In another variation without illumination, the cleaning mechanisms can be included. Similarly, in a further variation without cleaning mechanisms, illumination can be included.

As noted above, the close sensing cameras of the various sensor housings are arranged at a downward angle. By way of example, they may have a downward angle on the order of 20-40° to maximize lower field of view coverage and cover as much of the counterpart lidar's FOV as possible, because these cameras bolster the lidars' detection and classification. While different arrangements have been shown for co-location of the close sensing camera assemblies and lidar units, in general each camera is placed relative to its lidar unit so that it minimizes occlusions to the lidar in all instances.

Sensor cleaning is important to proper, effective operation of the perception system. There are different options for cleaning various sensors as the vehicle is operating in an autonomous driving mode. For instance, the cleaning system may spray a cleaning fluid onto a camera (and IR emitter), use a wiper, and/or an air puffer. A sprayer or other cleaning unit may be at a fixed position relative to the sensor, or may be configured to telescope out in order to clean the unit on an as-needed basis. The cleaning unit should be arranged to avoid occlusion of any of the sensors in the sensor housing or otherwise impact sensor FOV. For instance, the sprayer tips of cleaning mechanisms 718, 1412 and 1612 are positioned as such to not occlude the cameras and not reflect light back into the cameras.

In addition to cleaning, sensors may be conditioned, for instance by providing heat to eliminate condensation or frost from a camera or other sensor. By way of example, defrosting heaters may be positioned along the front window element of each perimeter view camera, such as a heating element sandwiched between the front glass and the housing of the camera unit.

A shroud or other structure can be employed to limit dirt and other foreign objects from covering the sensor. However, as with the cleaning elements, the shroud should not occlude the sensors or otherwise impact their FOV. In the case of a camera or illumination emitter, a hydrophobic coating may be applied to the glass or plastic cover to minimize moisture accumulation.

The positions of the sensors within the housing and along the vehicle should be considered when selecting the type and placement of cleaning unit. By way of example, it may be hard to clean a camera located in the side mirror assembly. For instance, it may be challenging to spray fluid onto a particular spot, or there may be limits on how to route fluid through the vehicle to cleaning unit (e.g., if the cleaning unit is located on-door v. off-door). The type of cleaning mechanism may be chosen in accordance with how important that sensor is for autonomous driving. By way of example, cleaning of the front sensor housing unit may be more critical than cleaning of the rear sensor housing unit, because it may be determined that a clear view of leading vehicles is more relevant to certain driving operations than a view of trailing vehicles. As such, redundant (e.g., spray system plus a wiper) cleaning modules may be employed for more critical sensor housings. For other sensor housing, there may be no redundant cleaning mechanism. In this case, the cleaning mechanism may only be actuated at certain speeds (e.g., below 35-45 mph) or when the vehicle is stationary, because cleaning may be less time sensitive than for other sensor housings.

FIG. 18 illustrates a flow diagram 1800 of a method in accordance with certain actions described above. At block 1802, a control system of a vehicle configured to operate in an autonomous driving mode imitates operation of a lidar sensor of a perception system of the vehicle, in order to obtain lidar data within a threshold distance in a region around the vehicle. For instance, the threshold distance may be within 1-3 meters from the vehicle. At block 1804, the control system initiates image capture by an image sensor of the perception system prior to the vehicle performing a driving action. The image sensor is disposed adjacent to the lidar sensor and arranged along the vehicle to have an overlapping field of view of the region around the vehicle within the threshold distance. The image sensor provides a selected resolution for objects within the threshold distance. At block 1806, the control system receives the lidar data from the lidar sensor and the captured imagery from the image sensor. This may be done concurrently or sequentially. At block 1808, the control system processes the lidar data to detect an object in the region within the threshold distance of the vehicle. At block 1810, the control system processes the captured imagery to classify the detected object. And at block 1812, the control system determines whether to cause one or more systems of the vehicle to further perform the driving action based on classification of the detected object.

Unless otherwise stated, the foregoing examples and embodiments are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples or embodiments. Further, the same reference numbers in different drawings can identify the same or similar elements. The processes or other operations may be performed in a different order or simultaneously, unless expressly indicated otherwise herein.

The invention claimed is:

1. An external sensing module for a vehicle configured to operate in an autonomous driving mode, the external sensing module comprising:
   a lidar sensor arranged along a first housing section of the external sensing module, the lidar sensor being configured to detect objects in a region of an external environment around the vehicle and within a threshold distance of the vehicle;
   an image sensor arranged along a second housing section of the external sensing module, the second housing section with the image sensor being vertically aligned with the first housing section with the lidar sensor, the image sensor being arranged along the vehicle to have an unobstructed field of view of the region of the external environment, the image sensor providing a selected resolution for objects within the threshold distance of the vehicle to classify objects detected by the lidar sensor; and
   a third housing section of the external sensing module disposed between the first and second housing sections, the third housing section including an exterior surface arranged to prevent interference between the image sensor and the lidar sensor.

2. The external sensing module of claim 1, wherein the image sensor is arranged above the lidar sensor.

3. The external sensing module of claim 1, wherein the image sensor is arranged below the lidar sensor.

4. The external sensing module of claim 1, wherein the image sensor is arranged at a downward angle relative to a side of the vehicle, the downward angle being on the order of 20-40° to provide coverage within the threshold distance of the vehicle.

5. The external sensing module of claim 4, wherein the threshold distance is between 1-3 meters from the vehicle.

6. The external sensing module of claim 1, further comprising one or more illuminator units configured to illuminate the field of view of the image sensor.

7. The external sensing module of claim 6, wherein the one or more illuminator units are disposed adjacent to the image sensor along the second housing section.

8. The external sensing module of claim 7, wherein the one or more illuminator units are a pair of illuminators disposed on either side of the image sensor.

9. The external sensing module of claim 6, further including a cleaning mechanism configured to clean the image sensor and/or the one or more illuminator units.

10. The external sensing module of claim 1, further comprising a radar sensor disposed along a fourth housing section of the external sensing module arranged to one side of both the first and second housing sections.

11. The external sensing module of claim 10, wherein the fourth housing section is arranged closer to a front of the vehicle than the first and second sections.

12. The external sensing module of claim 10, further comprising at least one additional image sensor disposed along a fifth housing section of the external sensing module, the fourth housing section being arranged between the fifth housing section and the first and second housing sections.

13. The external sensing module of claim 12, wherein the at least one additional image sensor comprises a given additional image sensor disposed generally planar to the radar sensor and arranged to provide a selected field of view along a side of the vehicle separate from the field of view of the image sensor arranged along the second housing section.

14. The external sensing module of claim 12, wherein the at least one additional image sensor comprises a given additional image sensor disposed generally perpendicular to the radar sensor and arranged to provide a selected field of view along a front of the vehicle separate from the field of view of the image sensor arranged along the second housing section.

15. The external sensing module of claim 12, wherein the at least one additional image sensor comprises:
   a first additional image sensor disposed generally planar to the radar sensor and arranged to provide a selected field of view along a side of the vehicle separate from the field of view of the image sensor arranged along the second housing section; and
   a second additional image sensor disposed generally perpendicular to the radar sensor and the first additional image sensor and arranged to provide a selected field of view along a front of the vehicle separate from the field of view of the image sensor arranged along the second housing section and the selected field of view of the first additional image sensor.

16. An external sensing module for a vehicle configured to operate in an autonomous driving mode, the external sensing module comprising:
   a radar sensor arranged along a first housing section of the external sensing module, the radar sensor being configured to detect objects in a region of an external environment around the vehicle and within a threshold distance of the vehicle; and
   an image sensor arranged along a second housing section of the external sensing module, the second housing section with the image sensor being adjacent to the first housing section with the radar sensor, the image sensor being arranged along the vehicle to have an overlapping field of view of the region of the external environment, the image sensor providing a selected resolution for objects within the threshold distance of the vehicle to classify objects detected by the radar sensor, wherein the selected resolution satisfies a threshold classification of a selected shape of at least one of the objects based on a minimum number of pixels.

17. The external sensing module of claim 16, wherein the external sensing module is disposed along a rear fascia of the vehicle to detect and classify objects behind the vehicle.

18. The external sensing module of claim 17, wherein the field of view of the image sensor is between 30-60° along the rear of the vehicle.

19. The external sensing module of claim 17, wherein the field of view of the image sensor has an outer azimuth of between 15-35° and an inner azimuth of between 10-25°.

20. The external sensing module of claim 17, wherein the second housing section is disposed closer to an adjacent side of the vehicle than the first housing section.

21. A vehicle configured to operate in an autonomous driving mode, the vehicle comprising:
   a driving system including:
      a deceleration system configured to control braking of the vehicle;
      an acceleration system configured to control acceleration of the vehicle; and
      a steering system configured to control wheel orientation and a direction of the vehicle; and
   an external sensing module including:
      a lidar sensor arranged along a first housing section of the external sensing module, the lidar sensor being configured to detect objects in a region of an external environment around the vehicle and within a threshold distance of the vehicle;
      an image sensor arranged along a second housing section of the external sensing module, the second housing section with the image sensor being vertically aligned with the first housing section with the lidar sensor, the image sensor being arranged along the vehicle to have an unobstructed field of view of the region of the external environment, the image sensor providing a selected resolution for objects within the threshold distance of the vehicle to classify objects detected by the lidar sensor; and
      a third housing section of the external sensing module disposed between the first and second housing sections, the third housing section including an exterior surface arranged to prevent interference between the image sensor and the lidar sensor.

22. The vehicle of claim 21, wherein the external sensing module further comprises one or more illuminator units configured to illuminate the field of view of the image sensor, the one or more illuminator units being disposed adjacent to the image sensor along the second housing section.

23. The vehicle of claim 22, wherein the external sensing module further includes a cleaning mechanism configured to clean the image sensor and/or the one or more illuminator units.

* * * * *